US012779857B2

(12) United States Patent
Inui et al.

(10) Patent No.: US 12,779,857 B2
(45) Date of Patent: Nov. 3, 2026

(54) INKJET RECORDING APPARATUS HAVING WIPE UNIT

(71) Applicant: KYOCERA Document Solutions Inc., Osaka (JP)

(72) Inventors: Yasutaka Inui, Osaka (JP); Shuhei Kawamata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 140 days.

(21) Appl. No.: 18/894,825

(22) Filed: Sep. 24, 2024

(65) Prior Publication Data

US 2025/0100289 A1 Mar. 27, 2025

(30) Foreign Application Priority Data

Sep. 27, 2023 (JP) ................................ 2023-166380

(51) Int. Cl.
*B41J 2/165* (2006.01)

(52) U.S. Cl.
CPC ....... *B41J 2/16552* (2013.01); *B41J 2/16541* (2013.01); *B41J 2/16544* (2013.01); *B41J 2/16585* (2013.01); *B41J 2/16538* (2013.01); *B41J 2002/16558* (2013.01); *B41P 2235/21* (2013.01)

(58) Field of Classification Search
CPC ........................ B41J 2/16552; B41J 2/16541; B41J 2/16544; B41J 2/16585; B41J 2/16538; B41J 2002/16558; B41P 2235/21
See application file for complete search history.

(56) References Cited

U.S. PATENT DOCUMENTS 10,259,225 B2 4/2019 Araki et al.
2018/0154639 A1* 6/2018 Furukawa ........... B41J 2/16535

FOREIGN PATENT DOCUMENTS

JP 2018-108711 A 7/2018

* cited by examiner

*Primary Examiner* — Henok D Legesse
(74) *Attorney, Agent, or Firm* — Studebaker Brackett PLLC

(57) ABSTRACT

An inkjet recording apparatus includes a blade, a first supply member, and a second supply member. The blade performs a wiping operation along a nozzle surface of an inkjet head. The first supply member is provided on a rear side of the nozzle surface in a moving direction in the wiping operation, and supplies a cleaning liquid to the blade. The second supply member is provided on a front side of the nozzle surface in the moving direction in the wiping operation, and supplies the cleaning liquid to the blade.

8 Claims, 23 Drawing Sheets

INKJET RECORDING APPARATUS HAVING WIPE UNIT

INCORPORATION BY REFERENCE

This application is based on and claims the benefit of priority from Japanese patent application No. 2023-166380 filed on Sep. 27, 2023 which is incorporated by reference in its entirety.

BACKGROUND

The present disclosure relates to an inkjet recording apparatus.

In the inkjet recording apparatus, it is considered that moisture evaporates from ink in a nozzle of an inkjet head during a period when an image forming job is not performed, and the nozzle is clogged due to an increase in a viscosity of the ink. To prevent the clogging, a purge treatment in which the ink in the nozzle is purged to a cap is performed. However, if the ink remaining on the nozzle surface is left, there is a problem that the ink falls on a sheet during the image forming job or the ink sticks to the nozzle surface. Therefore, a technique for removing the ink remaining on the nozzle surface has been studied. For example, a configuration has been proposed in which a blade in contact with the nozzle surface is slid to remove the ink from the nozzle surface.

In the above-described configuration, a supply member for supplying a cleaning liquid to the nozzle surface is provided in the inkjet head. When the supply member is used to clean the blade, there is a problem that a waste liquid adheres to the supply member, and the contaminated cleaning liquid is supplied for the wiping operation.

SUMMARY

An inkjet recording apparatus according to the present disclosure includes a blade, a first supply member, and a second supply member. The blade performs a wiping operation along a nozzle surface of an inkjet head. The first supply member is provided on a rear side of the nozzle surface in a moving direction in the wiping operation, and supplies a cleaning liquid to the blade. The second supply member is provided on a front side of the nozzle surface in the moving direction in the wiping operation, and supplies the cleaning liquid to the blade.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an inkjet recording apparatus according to one embodiment of the present disclosure will be described.

Figure 1:
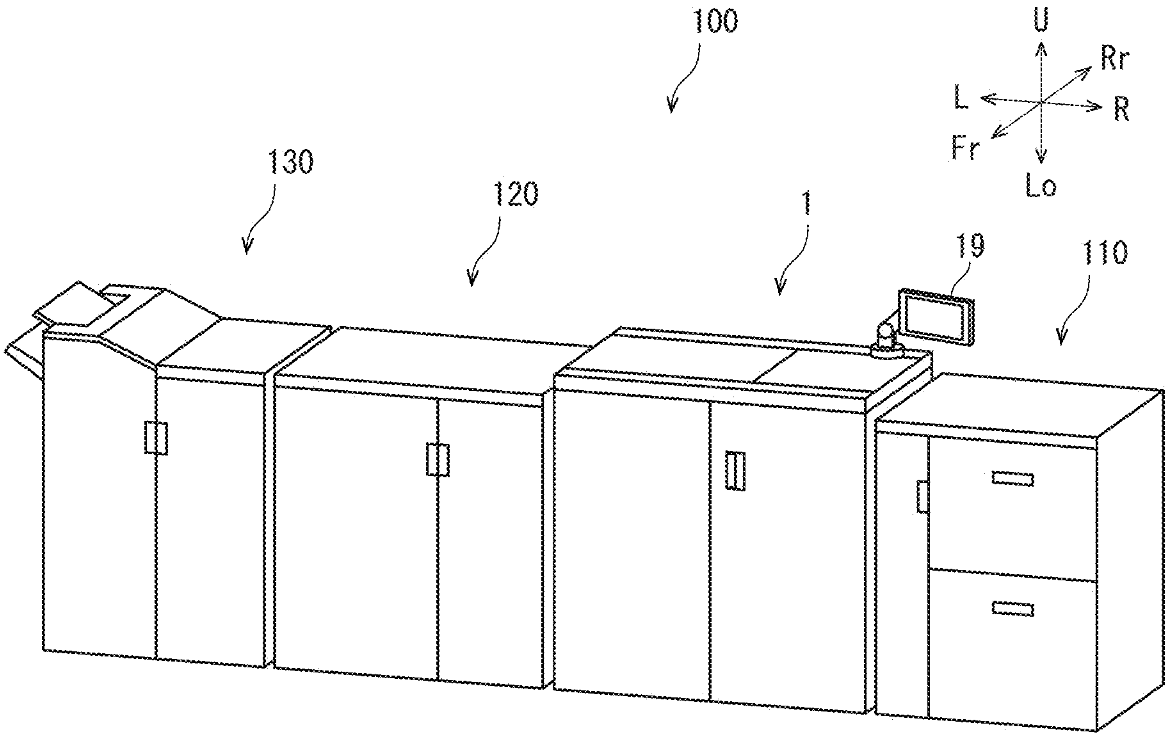
FIG. 1 is a perspective view showing an appearance of an image forming system according to one embodiment of the present disclosure.
Figure 2:
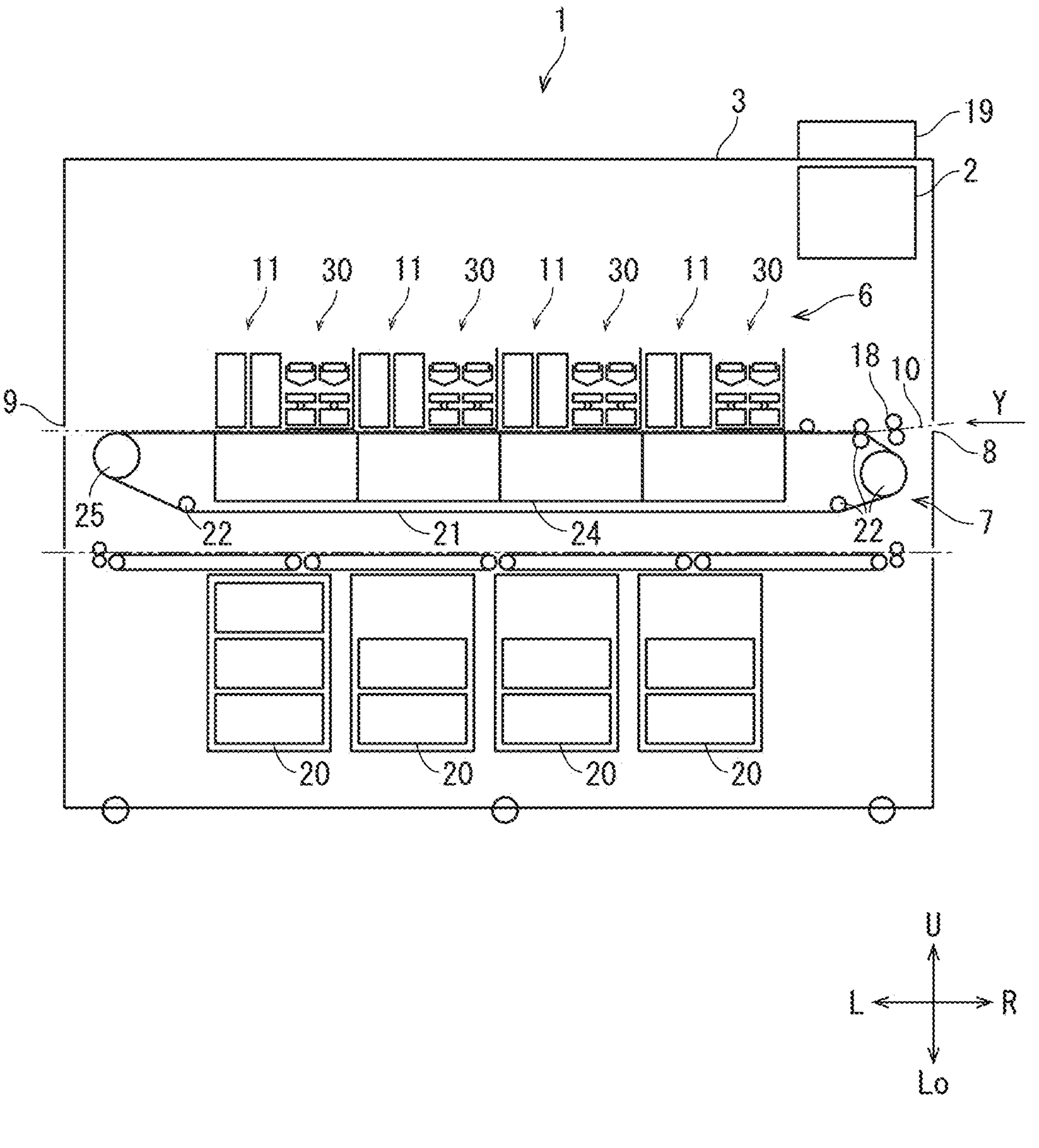
FIG. 2 is a front view schematically showing an internal structure of the inkjet recording apparatus according to the embodiment of the present disclosure.
Figure 3:
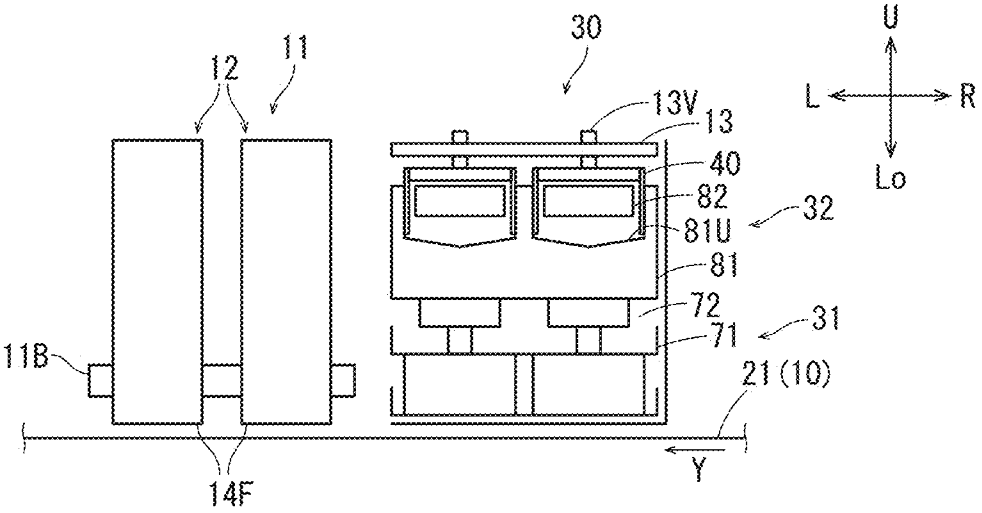
FIG. 3 is a front view schematically showing a head unit and a maintenance device according to the embodiment of the present disclosure.
Figure 4:
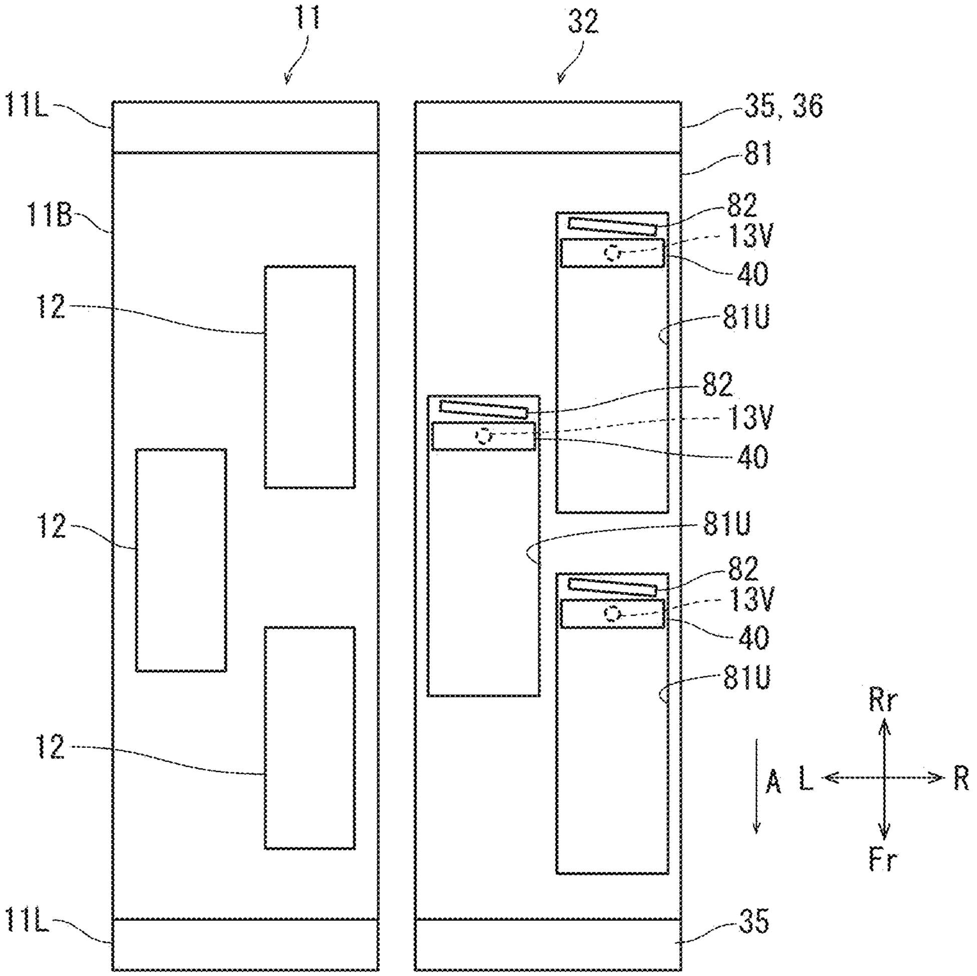
FIG. 4 is a plan view schematically showing the head unit and a wipe unit according to the embodiment of the present disclosure.
Figure 5:
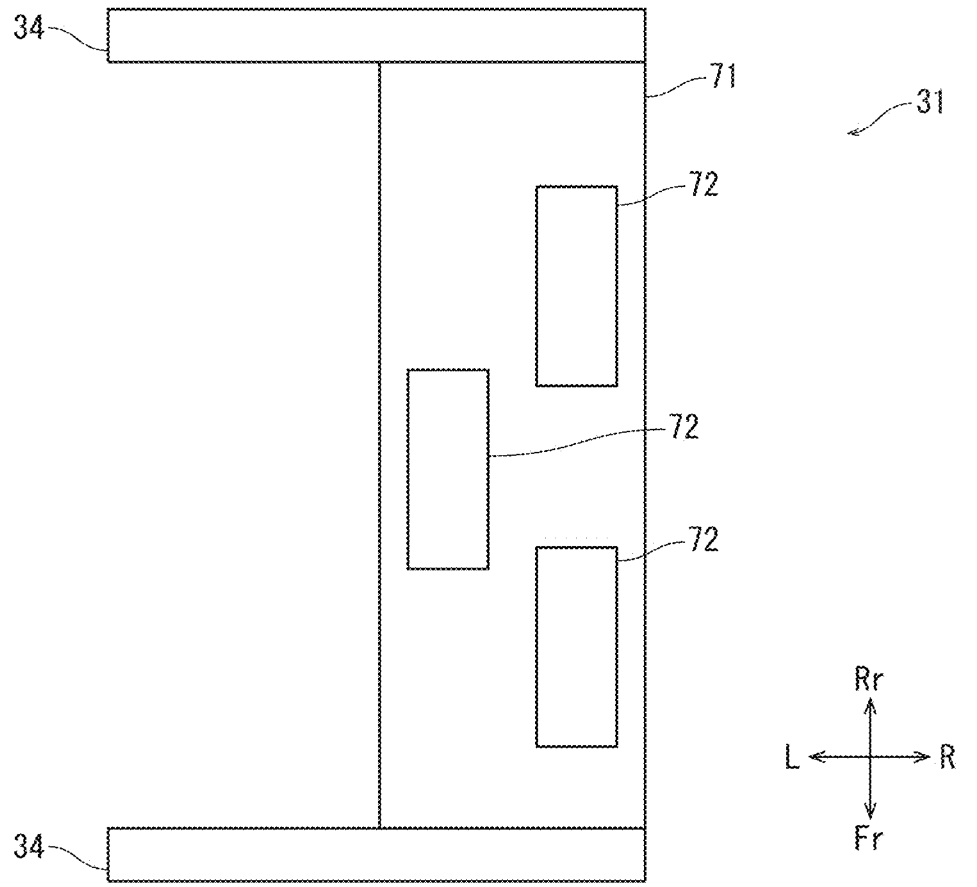
FIG. 5 is a plan view schematically showing the cap unit according to the embodiment of the present disclosure.
Figure 6:
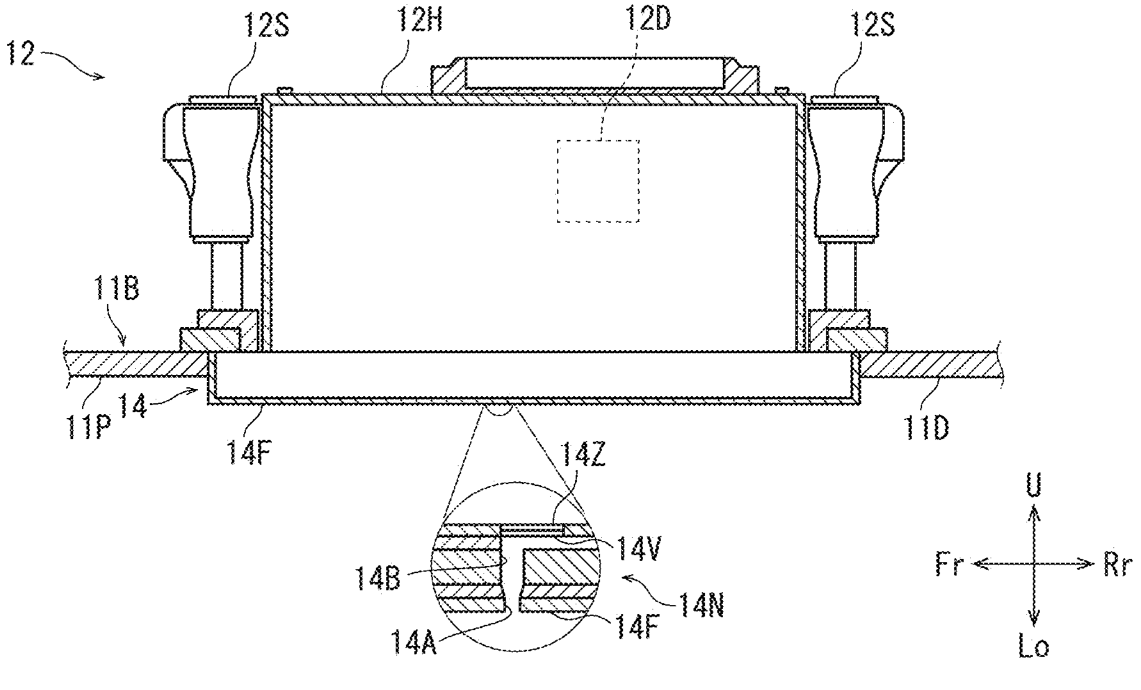
FIG. 6 is a cross-sectional view showing an inkjet head according to the embodiment of the present disclosure.

FIG. 1 is a perspective view showing an appearance of the image forming system 100. FIG. 2 is a front view schematically showing an internal structure of the inkjet recording apparatus 1. FIG. 3 is a front view schematically showing a head unit 11 and a maintenance device 30. FIG. 4 is a plan view schematically showing a head unit 11 and a wipe unit 32. FIG. 5 is a plan view schematically showing the cap unit 31. FIG. 6 is a cross-sectional view showing an inkjet head 12. Hereinafter, the front side of the paper plane on which FIG. 2 is drawn is set to the front side of the inkjet recording apparatus 1, and the left-and-right direction is described with reference to the direction when the inkjet recording apparatus 1 is viewed from the front side. In each figure, U, Lo, L, R, Fr, and Rr indicate the upper, lower, left, right, front, and rear, respectively.

The image forming system 100 (see FIG. 1) includes a sheet feeding apparatus 110, an inkjet recording apparatus 1, a drying apparatus 120, and a post-processing apparatus 130. The sheet feeding apparatus 110 stores several thousand of sheets S, and feeds the sheet S to the inkjet recording apparatus 1. The inkjet recording apparatus 1 forms an image on the sheet S by an inkjet method. The drying apparatus 120 heats the sheet conveyed from the inkjet recording apparatus 1, and dries ink. The post-processing apparatus 130 performs post-processing such as drilling, stapling, and folding on the sheet S.

The inkjet recording apparatus 1 (see FIG. 2) includes a box-shaped body housing 3. In the center portion of the inside of the body housing 3, a conveying unit 7 which attracts the sheet S and conveys it in the Y direction is provided. Above the conveying unit 7, an image forming unit 6 which forms an image by ejecting the ink is provided. On the right surface of the body housing 3, a sheet feeding port 8 through which the sheet S is received from the sheet feeding apparatus 110 is provided. On the left side surface of the body housing 3, a discharge port 9 through which the sheet S on which the image is formed is discharged to the drying apparatus 120 is provided. Inside the body housing 3, a conveyance path 10 is provided from the sheet feeding port 8 to the discharge port 9 through a gap between the conveying unit 7 and the image forming unit 6. A registration roller 18 is provided on the upstream side of the conveying unit 7 in the conveyance direction Y.

The conveying unit 7 includes an endless conveying belt 21 and a suction part 24. The conveying belt 21 has a large number of air holes (not shown), and is wound around a driving roller 25 and a driven roller 22. The upper surface of the suction part 24 has a large number of air holes (not shown), and is in contact with the inner surface of the conveying belt 21. The suction part 24 sucks air through the air holes of the conveying belt 21 and the air holes of the suction part 24, so that the sheet S is attracted to the conveying belt 21. When the driving roller 25 is driven in the counterclockwise direction by a driving part (not shown) including a motor and a reduction gear, the conveying belt 21 travels in the counterclockwise direction, and the sheet S attracted to the conveying belt 21 is conveyed.

The image forming unit 6 includes a plurality (in this embodiment, four) of head units 11. The head unit 11 (see FIG. 3, FIG. 4) includes one or more inkjet heads 12 (in the present embodiment, three). Ink containers 20 filled with the black, cyan, magenta, and yellow ink are connected to the respective head units 11.

The inkjet head 12 (see FIG. 6) includes a rectangular parallelepiped housing 12H whose longitudinal direction is along the front-and-rear direction, a nozzle plate 14 provided at the bottom of the housing 12H, and a socket 12S to which a pipe for supplying the ink is connected. The nozzle plate 14 is provided with a large number of nozzles 14N arranged in the front-and-rear direction. The nozzle 14N includes a branch channel 14B branched from the downstream side of the socket 12S, and an ejection port 14A provided on a nozzle surface 14F which is the lower surface of the nozzle plate 14. A diaphragm 14V also serves as a part of the inner wall of the branch channel 14B. The diaphragm 14V is provided with a pressurizing element 14Z. As the pressurizing element 14Z, a piezoelectric element, an electrostatic actuator, a heater or the like are used. A driving circuit 12D for driving the pressurizing element 14Z is connected to the pressurizing element 14Z.

A control part 2 (see FIG. 2) includes an arithmetic part and a storage part (not shown). The arithmetic part is, for example, a CPU (Central Processing Unit). The storage part includes a storage medium such as ROM (Read Only Memory), RAM (Random Access Memory), EEPROM (Electrically Erasable Programmable Read Only Memory), and the like. The arithmetic part reads the control program stored in the storage part and executes various processes. The control part 2 may be implemented by an integrated circuit that does not use software.

A display operation part 19 is provided on the upper portion of the body housing 3 (see FIG. 1, FIG. 2). The display operation part 19 includes a display panel, a touch panel laminated on the display panel, and a keypad (not shown). The control part 2 displays a screen representing an operation menu, a status, or the like of the inkjet recording apparatus 1 on the display panel, and controls each part of the inkjet recording apparatus 1 in accordance with the operation detected by the touch panel and the keypad.

The basic image forming operation of the inkjet recording apparatus 1 is as follows. When an image forming job is inputted to the inkjet recording apparatus 1 from the display operation part 19 or an external computer, the sheet feeding apparatus 110 feeds the sheet S to the conveyance path 10 through the sheet feeding port 8, and the registration roller 18 whose rotation is stopped corrects the skew of the sheet S. When the registration roller 18 sends the sheet S to the conveying unit 7 at a predetermined timing, the conveying unit 7 attracts the sheet S to the conveying belt 21, and conveys the sheet S in the Y direction. The ink is ejected from the nozzle to form an image on the sheet S. The sheet S on which the image is formed is conveyed to the drying apparatus 120 through the discharge port 9.

[Maintenance Device] Next, a maintenance device 30 will be described. Since the four head units 11 (see FIG. 2) have the same configuration and the four maintenance devices 30 have the same configuration, one head unit 11 and one maintenance device 30 for performing maintenance of the head unit 11 will be described below.

[Head Base] The head unit 11 includes a head base 11B (see FIG. 3, FIG. 4 and FIG. 6) which supports the inkjet heads 12. On the head base 11B, the three inkjet heads 12 are provided in a staggered pattern. The head base 11B is a generally rectangular plate-like member whose longitudinal direction is along the front-and-rear direction. The head base 11B has through-holes (not shown) into which the nozzle plates 14 of the inkjet heads 12 are inserted. The lower surface of the head base 11B is a surface parallel to the nozzle surface 14F (hereinafter, it is referred to as a parallel surface 11P). The nozzle surface 14F protrudes downward from the parallel surface 11P.

The maintenance device 30 (see FIG. 3) is provided on the lateral side (in this embodiment, the upstream side in the conveyance direction Y (the right side)) of the head unit 11. The maintenance device 30 includes a cap unit 31, a wipe unit 32, and a cleaning liquid supply source 13.

[Cap Unit] The cap unit 31 (see FIG. 3 and FIG. 5) is provided with the same number (in this embodiment, three) of caps 72 as the inkjet heads 12 provided in the head unit 11. The three caps 72 are arranged in a staggered pattern in the same manner as the inkjet heads 12, and are supported by a frame 71.

[Wipe Unit] The wipe unit 32 (see FIG. 3 and FIG. 4) includes a waste liquid tray 81, a blade 82, and a cleaning liquid supply part 40. The waste liquid tray 81 is provided with the same number of recesses 81U as the inkjet heads 12 provided in the head unit 11. The recesses 81U are arranged in a staggered pattern in the same manner as the inkjet heads 12. The blade 82 and the cleaning liquid supply part 40 are provided in each of the recesses 81U.

[Head Lifting Device] FIG. 23 is a front view showing an operation of the maintenance device 30. Head lifting devices 11L (see FIG. 4) are provided on the front and rear sides of the head base 11B, respectively. The head lifting device 11L is constituted of, for example, a ball screw, a belt driving device, and the like. The head lifting device 11L lifts and lowers the head unit 11 between an image forming position (see FIG. 23(A)) and a retracted position (see FIG. 23(B)). The image forming position is a position where a distance between the conveyance path 10 (the upper surface of the conveying belt 21) along which the sheet is conveyed and the nozzle surface 14F is a predetermined distance suitable for the image formation. The retracted position is a position higher than the image forming position, and is a position where the head unit 11 does not interfere with the wipe unit 32 when the cap unit 31 and the wipe unit 32 are horizontally slid using a cap sliding device 34 described later.

[Cap Sliding Device] The cap sliding devices 34 (see FIG. 5) are provided on the front and rear sides of the frame 71 of the cap unit 31, respectively. The cap sliding device 34 is constituted of, for example, a ball screw, a belt driving device, and the like. The cap sliding device 34 slides the cap unit 31 to a home position (see FIG. 23(A)) and a maintenance position (see FIG. 23(F)). The home position is a position on the right side of the head unit 11 positioned at the image forming position. The maintenance position is a position below the head unit 11 positioned at the retracted position.

[Wipe Lifting Device] Wipe lifting devices 35 (see FIG. 4) are provided on the front and rear sides of the waste liquid tray 81 of the wipe unit 32, respectively. The wipe lifting device 35 is constituted of, for example, a cam mechanism, a ball screw, or the like. The wipe lifting device 35 lifts and lowers the wipe unit 32 to a contact position (see FIG. 23(B)) and a separated position (see FIG. 23(E)). The contact position is a position where the waste liquid tray 81 is in contact with the caps 72. The separated position is a position where the waste liquid tray 81 is separated upward by a predetermined distance from the caps 72.

When the wipe unit 32 is positioned at the contact position, since the wipe unit 32 is placed on the cap unit 31, when the cap sliding device 34 is operated, the wipe unit 32 is slid to the home position and the maintenance position together with the cap unit 31. That is, the cap sliding device 34 also functions as a wipe sliding device for sliding the wipe unit 32 to the home position and the maintenance position. When the wipe unit 32 is positioned at the separated position, when the cap sliding device 34 is operated, the cap unit 31 is slid independently to the home position and the maintenance position while leaving the wipe unit 32 at the home position.

Figure 7:
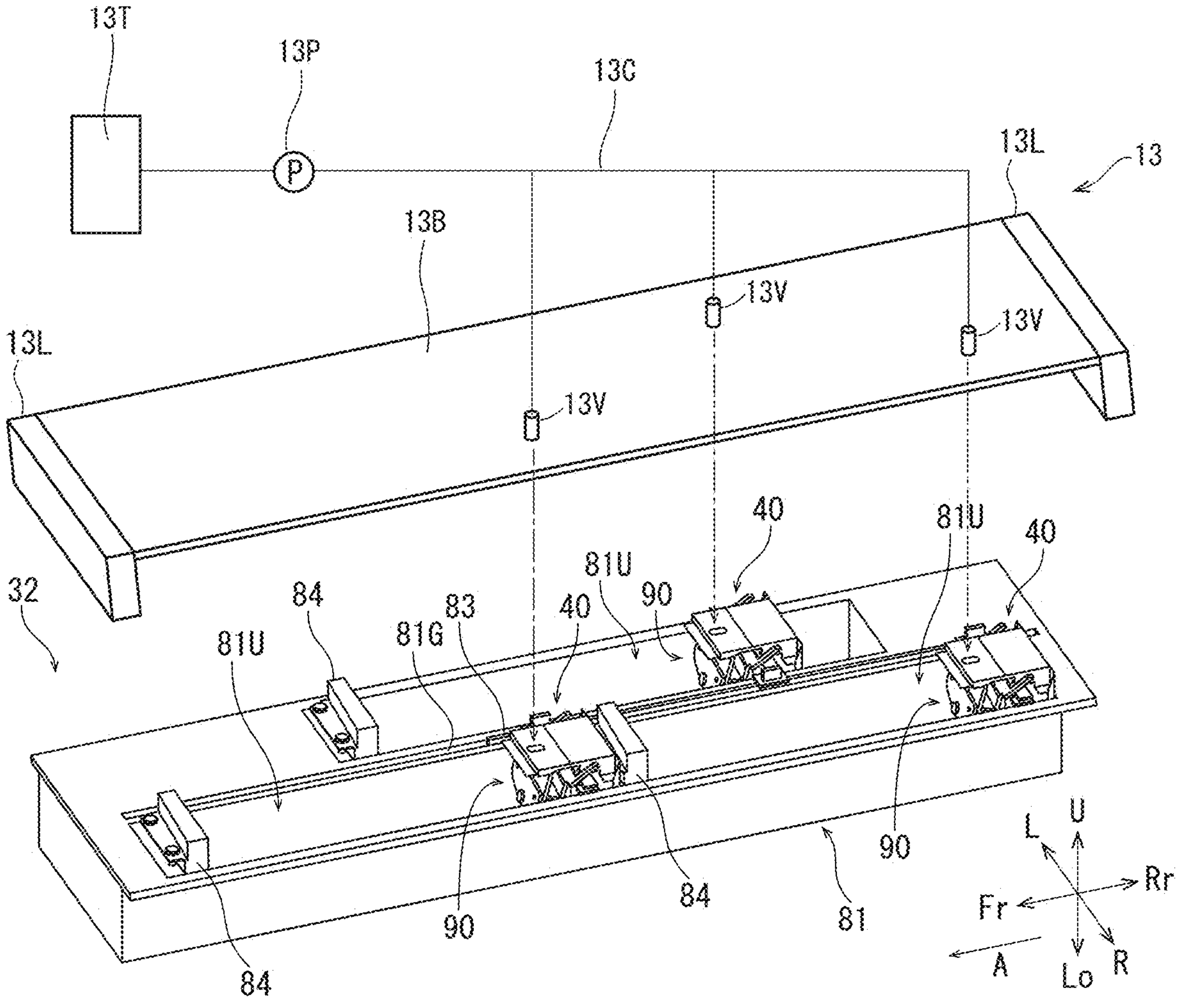
FIG. 7 is a perspective view showing the wipe unit and a cleaning liquid supply source according to the embodiment of the present disclosure.
Figure 8:
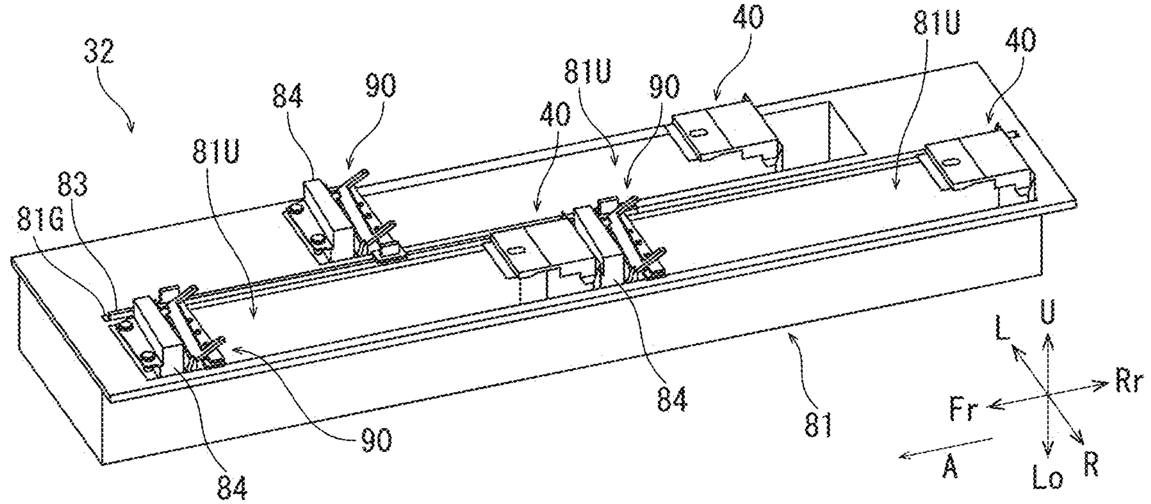
FIG. 8 is a perspective view showing the wipe unit according to the embodiment of the present disclosure.
Figure 9:
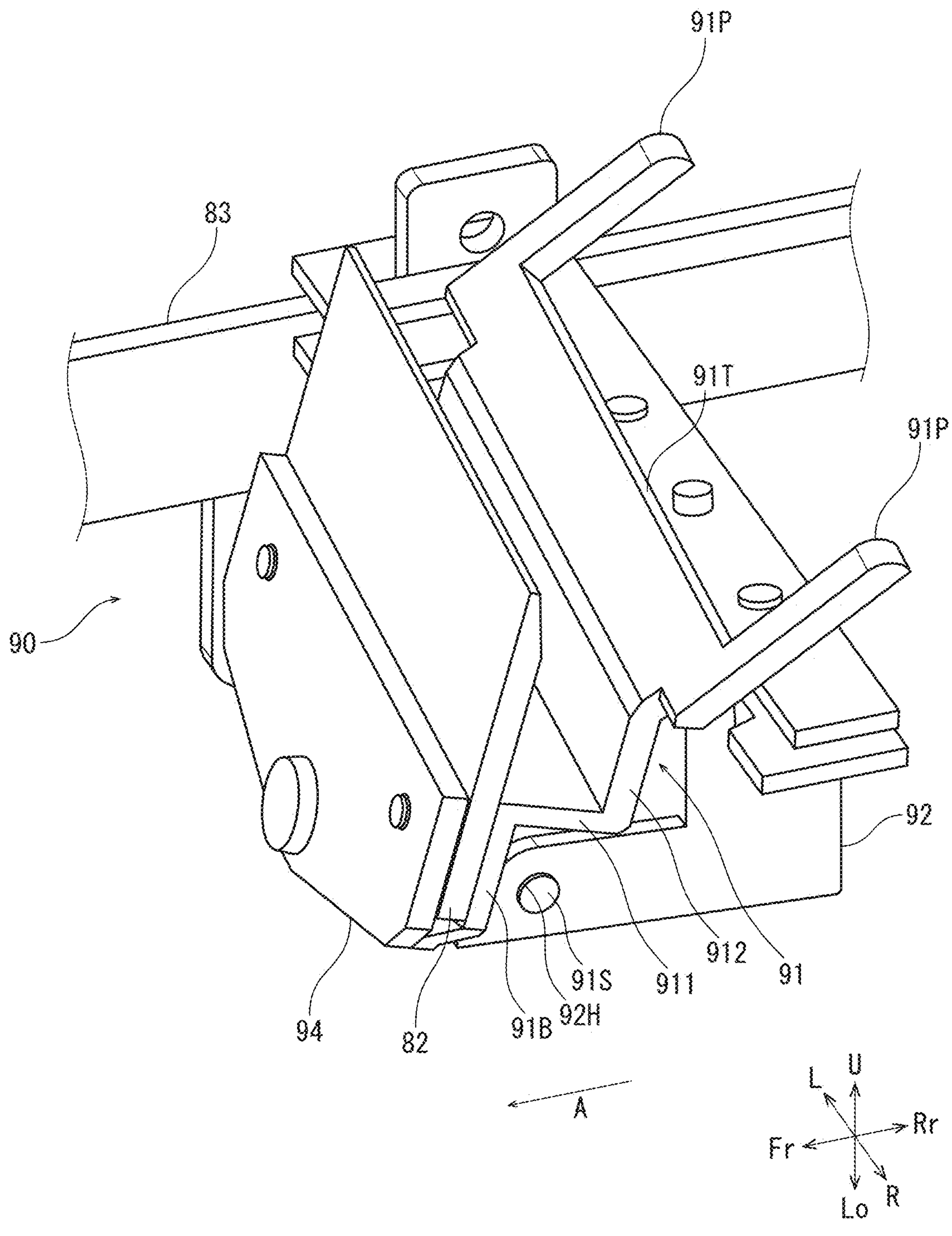
FIG. 9 is a perspective view showing a blade unit according to the embodiment of the present disclosure.
Figure 10:
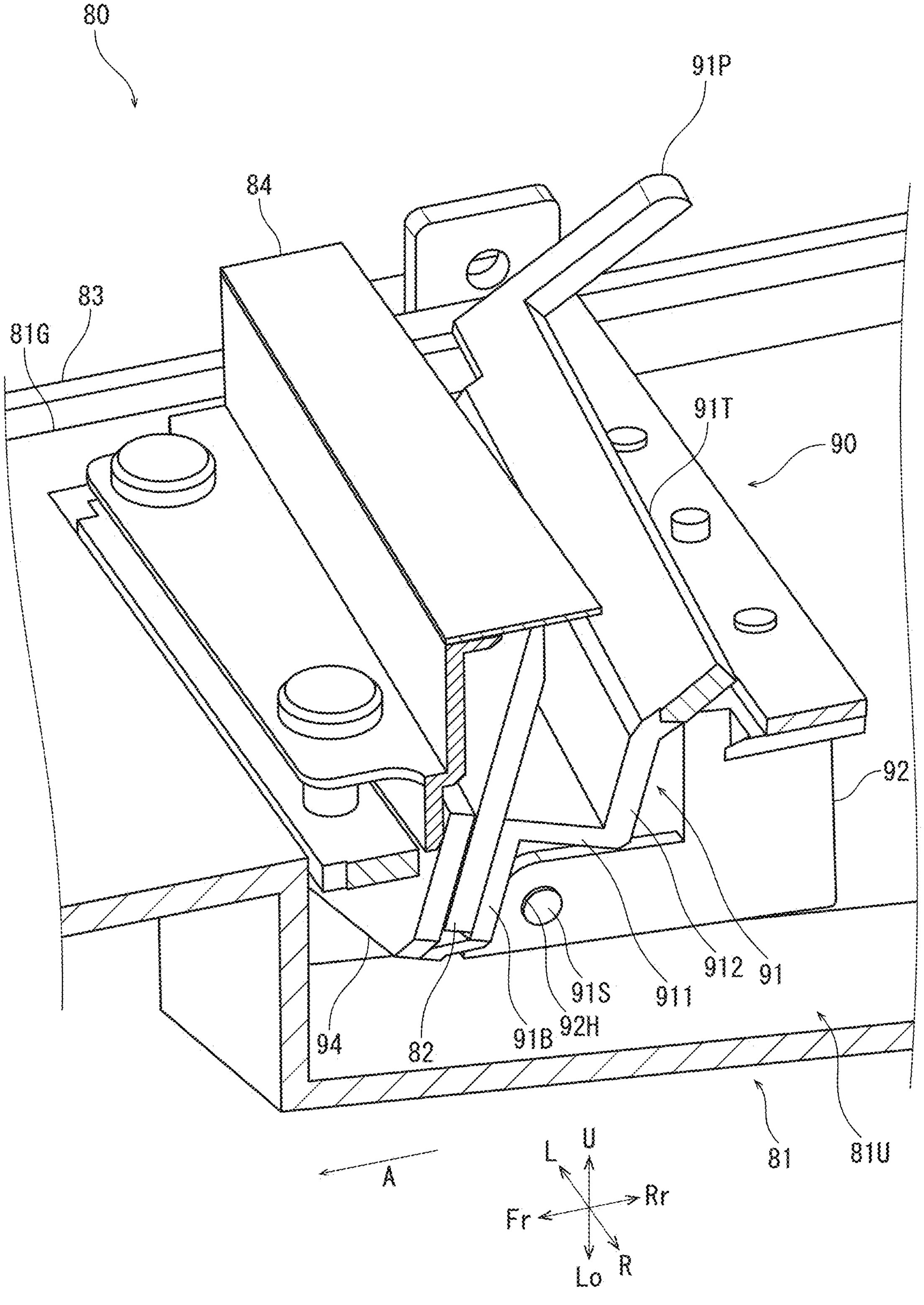
FIG. 10 is a perspective view showing a cross section of the blade unit according to the embodiment of the present disclosure.
Figure 11:
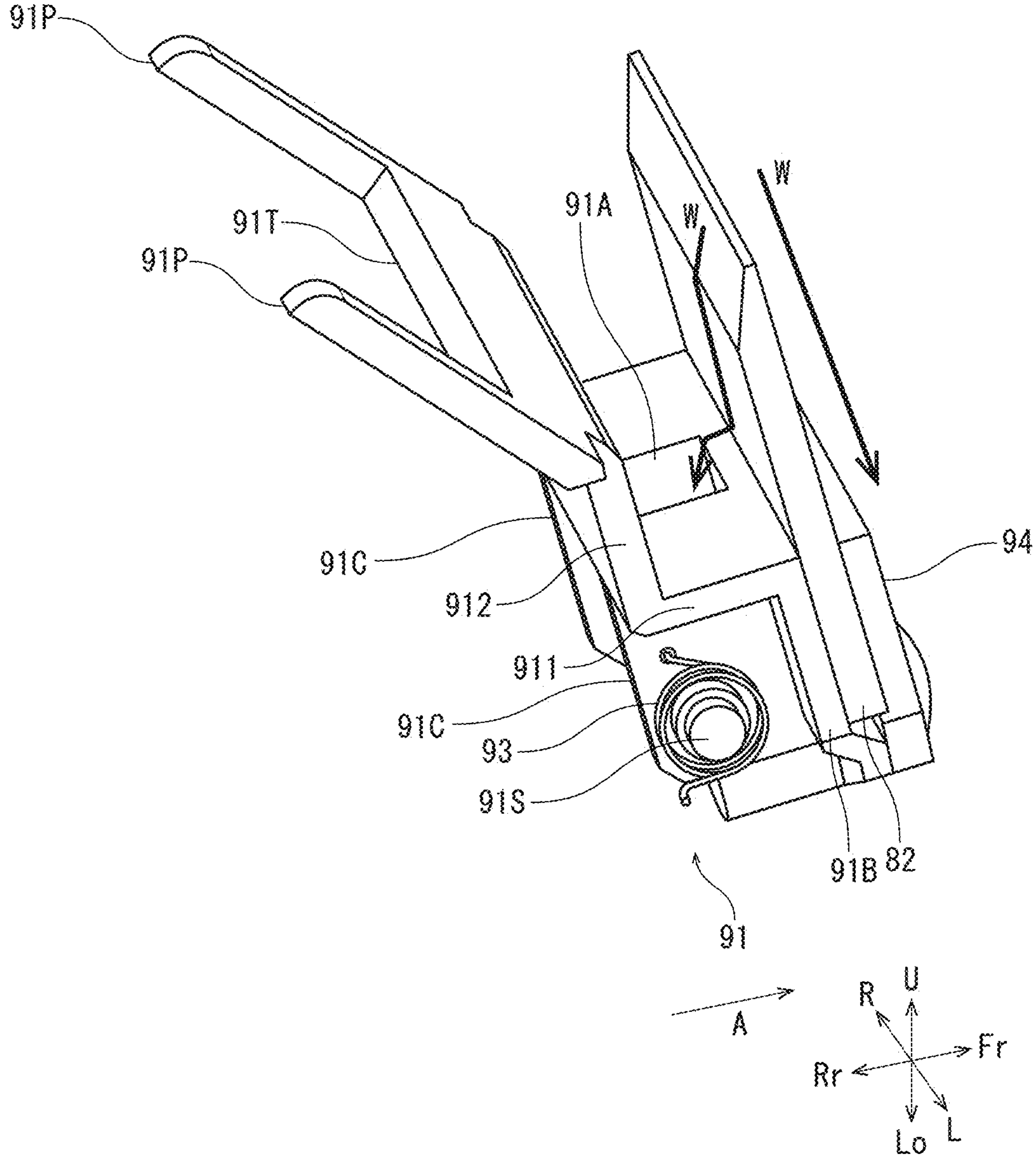
FIG. 11 is a perspective view showing a protruding member and a blade according to the embodiment of the present disclosure.
Figure 12:
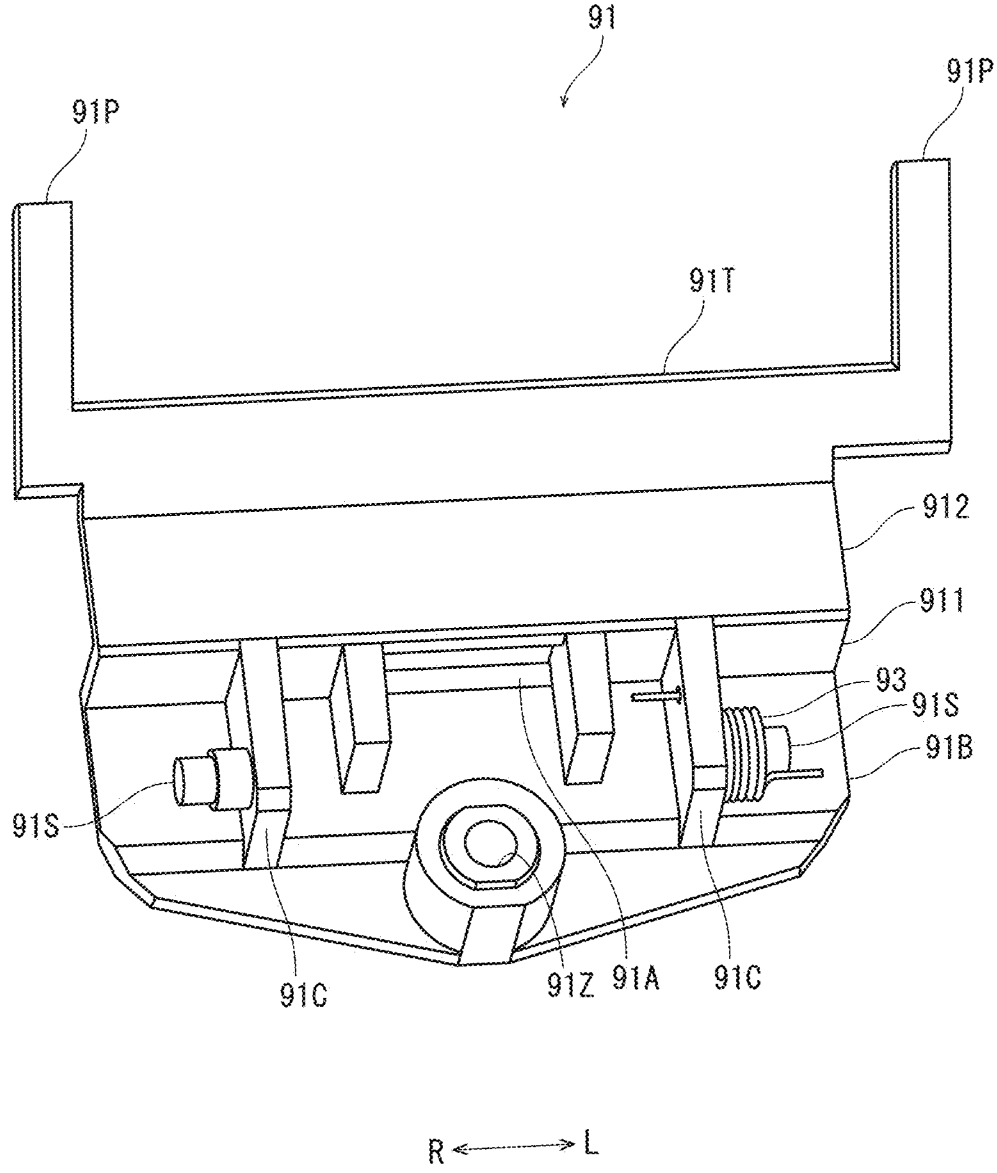
FIG. 12 is a perspective view showing the protruding member according to the embodiment of the present disclosure.

[Wipe Unit] Next, the structure of the wipe unit 32 will be described in detail. FIG. 7 is a perspective view showing the wipe unit 32 and a cleaning liquid supply source 13. FIG. 8 is a perspective view showing the wipe unit 32. FIG. 9 is a perspective view showing a blade unit 90. FIG. 10 is a perspective view showing a cross section of the blade unit 90. FIG. 11 is a perspective view showing a protruding member 91 and a blade 82. FIG. 12 is a perspective view showing the protruding member 91.

The wipe unit 32 includes a plurality of (in this embodiment, three) blade units 90, the waste liquid tray 81, and a carriage 83. The blade unit 90 (see FIG. 11 and FIG. 12) includes the blade 82, a protruding member 91, a holder 92, and a first biasing member 93.

[Blade] The blade 82 (see FIG. 9 to FIG. 11) is a flexible, generally rectangular plate-like member made of resin or the like. The blade 82 is held by the holder 92 in a slightly rearward inclined posture with the thickness direction being along the front-and-rear direction. A width of the blade 82 in the left-and-right direction is equal to or larger than a width of the nozzle surface 14F. The upper portion of the blade 82 is tapered so as to be thinner toward the tip end.

[Protruding Member] The protruding member 91 (see FIG. 9 to FIG. 12) is integrated with the blade 82. The protruding member 91 has a base portion 91B parallel to the blade 82, a first bent portion 911 bent rearward from the upper end of the base portion 91B, a second bent portion 912 bent upward from the rear end of the first bent portion 911, a rearward inclined portion 91T inclined more rearward than the second bent portion 912, and protruding portions 91P protruding upward from both left and right ends of the rearward inclined portion 91T and inclined rearward at the same inclination angle as that of the rearward inclined portion 91T.

A width of the base portion 91B in the left-and-right direction is equal to a width of the blade 82. A length of the base portion 91B in the upper-and-lower direction is shorter than a length of the blade 82 in the upper-and-lower direction. The base portion 91B is joined on the lower portion of the rear surface of the blade 82. Widths of the first bent portion 911 and the second bent portion 912 in the left-and-right direction are equal to a width of the base portion 91B. A width of the rearward inclined portion 91T in the left-and-right direction is wider than a width of the base portion 91B. The position of the protruding portions 91P in the left-and-right direction is determined so that the distal ends of the protruding portions 91P can be in contact with the right and left parallel surfaces 11P of the nozzle surface 14F.

On the rear surface of the base portion 91B, two wall portions 91C facing each other in the left-and-right direction are provided (see FIG. 11 and FIG. 12). A shaft portion 91S protruding leftward is provided on the left surface of the left wall portion 91C. A shaft portion 91S protruding rightward is provided on the right surface of the right wall portion 91C.

A through-hole 91A penetrating downward is provided at the center portion of the first bent portion 911 in the left-and-right direction (see FIG. 11 and FIG. 12). At least a part of a waste liquid W (a mixture of the ink and a cleaning liquid) flowing down along the rear surface of the blade 82 falls downward through the through-hole 91A.

[Fixing Member]A fixing member 94 (see FIG. 9 to FIG. 11) fixes the blade 82 to the protruding member 91. The lower portion of the blade 82 is held between the base portion 91B of the protruding member 91 and the fixing member 94, and the fixing member 94 is fastened to the protruding member 91. The lower edge portion of the fixing member 94 and the lower edge portion of the protruding member 91 are tapered such that their widths in the left-and-right direction become narrower toward the lower ends (see FIG. 9 and FIG. 12). The waste liquid flowing down from the front surface of the blade 82 to the front surface of the fixing member 94 is collected at the center in the left-and-right direction along the lower edge portion of the fixing member 94 and the lower edge portion of the protruding member 91, and falls into the recess 81U of the waste liquid tray 81.

[Holder] The holder 92 (see FIG. 9 to FIG. 11) holds the blade 82 through the protruding member 91. The lower portion of the holder 92 is provided with shaft holes 92H into which the shaft portions 91S of the protruding member 91 are inserted. The protruding member 91 can be turned in the front-and-rear direction around the shaft portions 91S. The blade 82 is turned together with the protruding member 91. The blade 82 and the protruding member 91 are provided on the holder 92 in a posture inclined with respect to the left-and-right direction so that the waste liquid W flows in one of the left and right directions. In the illustrated example, the blade 82 is inclined such that the left end portion is positioned on the slightly rear side from the right end portion, but may be inclined in the opposite direction.

[First Biasing Member] The first biasing member 93 (see FIG. 11 and FIG. 12) is, for example, a torsion coil spring, and is wound around the shaft portion 91S. One end of the first biasing member 93 is engaged with the holder 92, and the other end is engaged with the protruding member 91. The first biasing member 93 biases the protruding member 91 in the counterclockwise direction in FIG. 9 and FIG. 10 and in the clockwise direction in FIG. 11. In other words, the first biasing member 93 biases the blade 82 in a direction in which the tip end portion of the blade 82 is pressed against the nozzle surface 14F. The first biasing member 93 may be a plate spring, a compression coil spring, or the like.

[Waste Liquid Tray] The waste liquid tray 81 (see FIG. 7 and FIG. 8) is formed in a rectangular shape whose longitudinal direction is along the front-and-rear direction as a whole. The waste liquid tray 81 has three recesses 81U with the upper side open. The three recesses 81U are arranged in a staggered pattern in the same manner as the inkjet heads 12. The recess 81U is formed in a rectangular shape elongated in the front-and-rear direction when viewed from the upper side. A length of the recess 81U in the front-and-rear direction is longer than that of the nozzle surface 14F, and a width of the recess 81U in the left-and-right direction is wider than that of the nozzle surface 14F. The recess 81U receives the waste liquid containing the ink and the cleaning liquid.

[Carriage] The carriage 83 (see FIG. 7 to FIG. 10) is formed in a plate shape whose longitudinal direction is along the front-and-rear direction. A groove 81G along the front-and-rear direction is provided between the left and right recesses 81U, and the carriage 83 is housed in the groove 81G. A length of the carriage 83 in the front-and-rear direction is shorter than a length of the groove 81G in the front-and-rear direction. The carriage 83 is slidable in the front-and-rear direction along the groove 81G.

The blade units 90 are housed in the three recesses 81U, respectively. The three blade units 90 are coupled to the carriage 83. The three blade units 90 are arranged on the carriage 83 such that the three blade units 90 are positioned on the rear side of the nozzle surface 14F when the carriage 83 is positioned rearmost.

[Carriage Driving Device] The waste liquid tray 81 is provided with a carriage driving device 36 (see FIG. 4). The carriage driving device 36 is constituted of, for example, a belt driving device, a feed screw, and the like, and slides the carriage 83 along the groove 81G to slid the blade 82. By sliding the blade 82 forward (one example of the moving direction A in the wiping operation), a wiping operation in which the blade 82 scrapes the ink from the nozzle surface 14F is performed. FIG. 7 shows a state in which the blade 82 is positioned at a wiping operation start position. FIG. 8 shows a state in which the blade 82 is positioned at a wiping operation end position.

Figure 13:
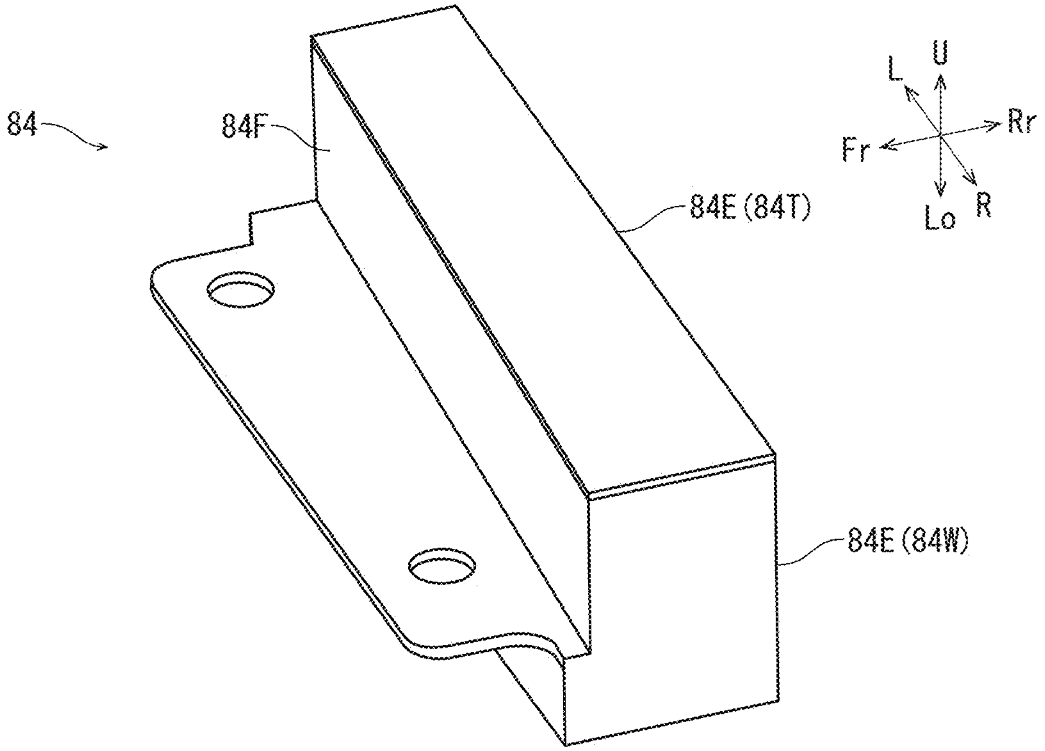
FIG. 13 is a perspective view showing a receiving member according to the embodiment of the present disclosure.
Figure 14:
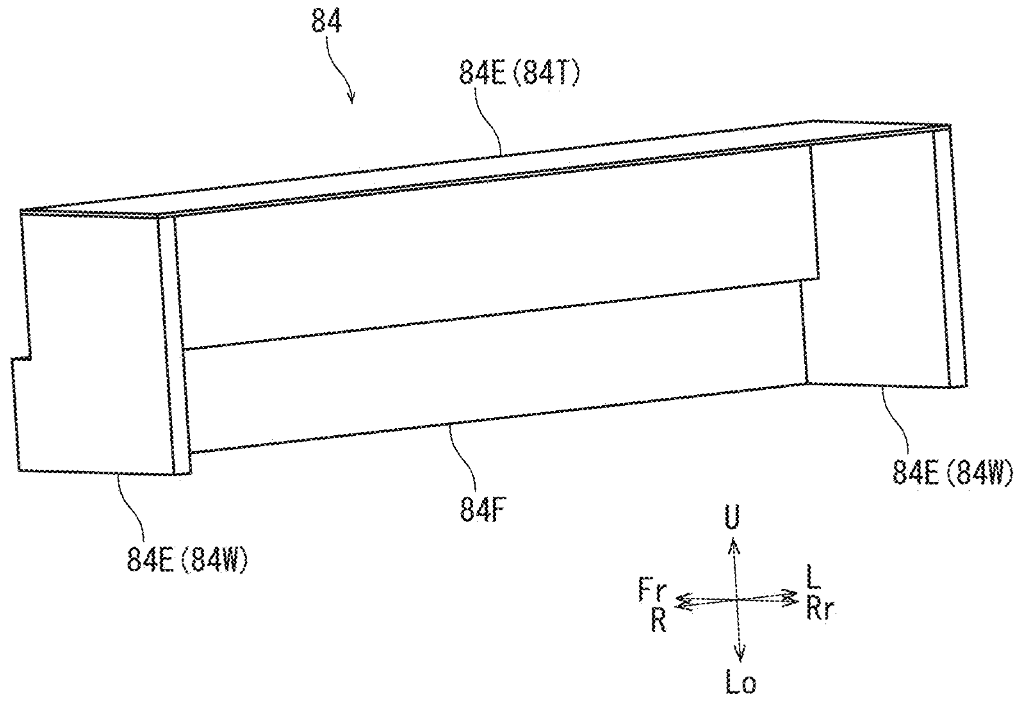
FIG. 14 is a perspective view showing the receiving member according to an embodiment of the present disclosure.

[Receiving Member] FIG. 13 and FIG. 14 are perspective views showing a receiving member 84. The receiving member 84 is supported by the waste liquid tray 81 (see FIG. 7, FIG. 8 and FIG. 10). The receiving member 84 is provided at the front end portion of each of the three recesses 81U. The receiving member 84 has a front surface portion 84F facing the front surface of the blade 82, a ceiling portion 84T extending rearward from the upper end portion of the front surface portion 84F, and side wall portions 84W extending rearward from both right and left end portions of the front surface portion 84F. That is, the receiving member 84 is formed in a box shape in which the rear side and the lower side are opened.

When the blade 82 reaches the foremost portion of the recess 81U, the blade 82 is housed in the receiving member 84. At this time, the blade 82 is surrounded by the receiving member 84 from the front side, the upper side, and the right and left sides. Either one of the ceiling portion 84T and the side wall portions 84W may be provided.

Figure 15:
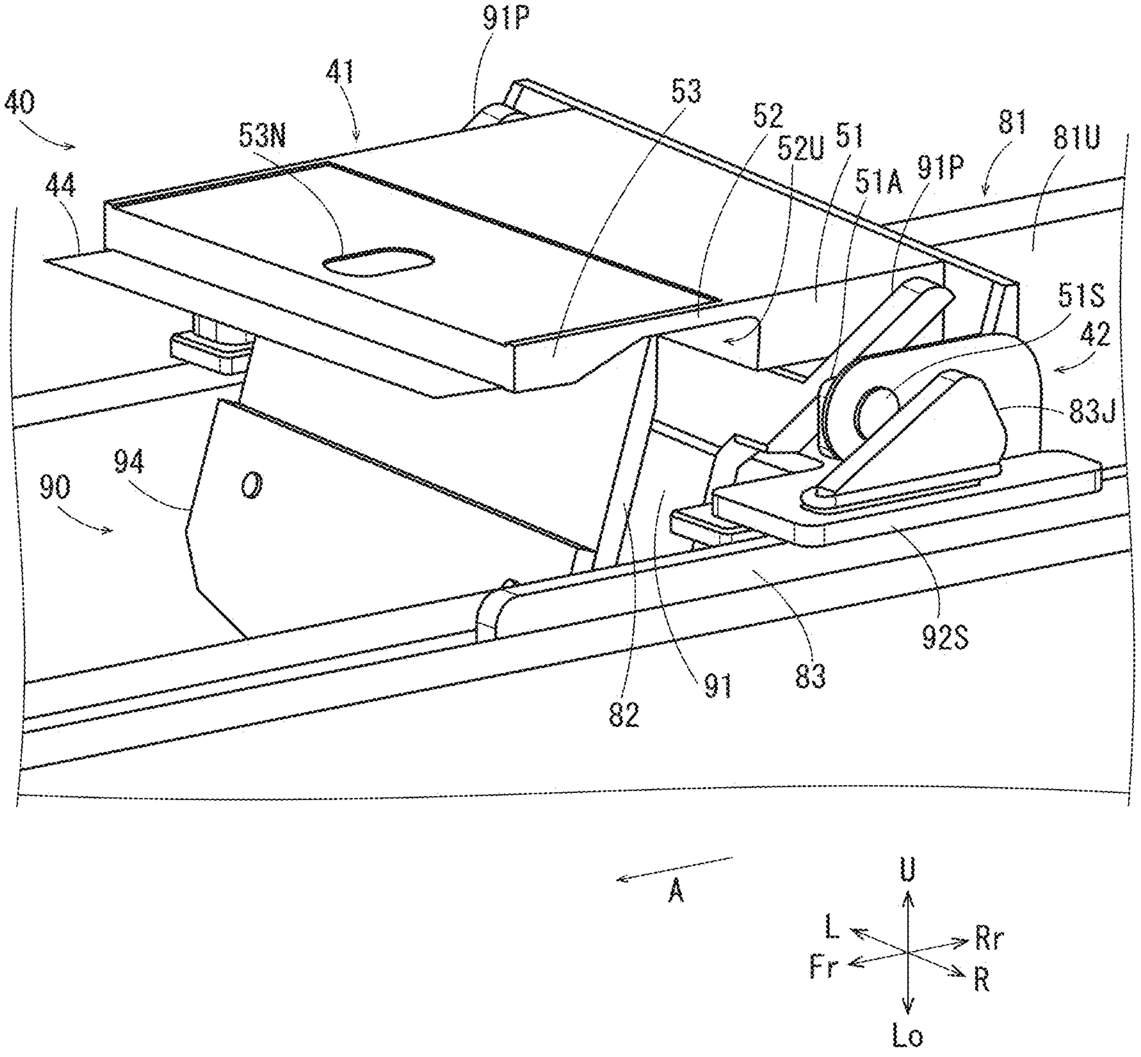
FIG. 15 is a perspective view showing a cleaning liquid supply part and the blade unit according to the embodiment of the present disclosure.
Figure 16:
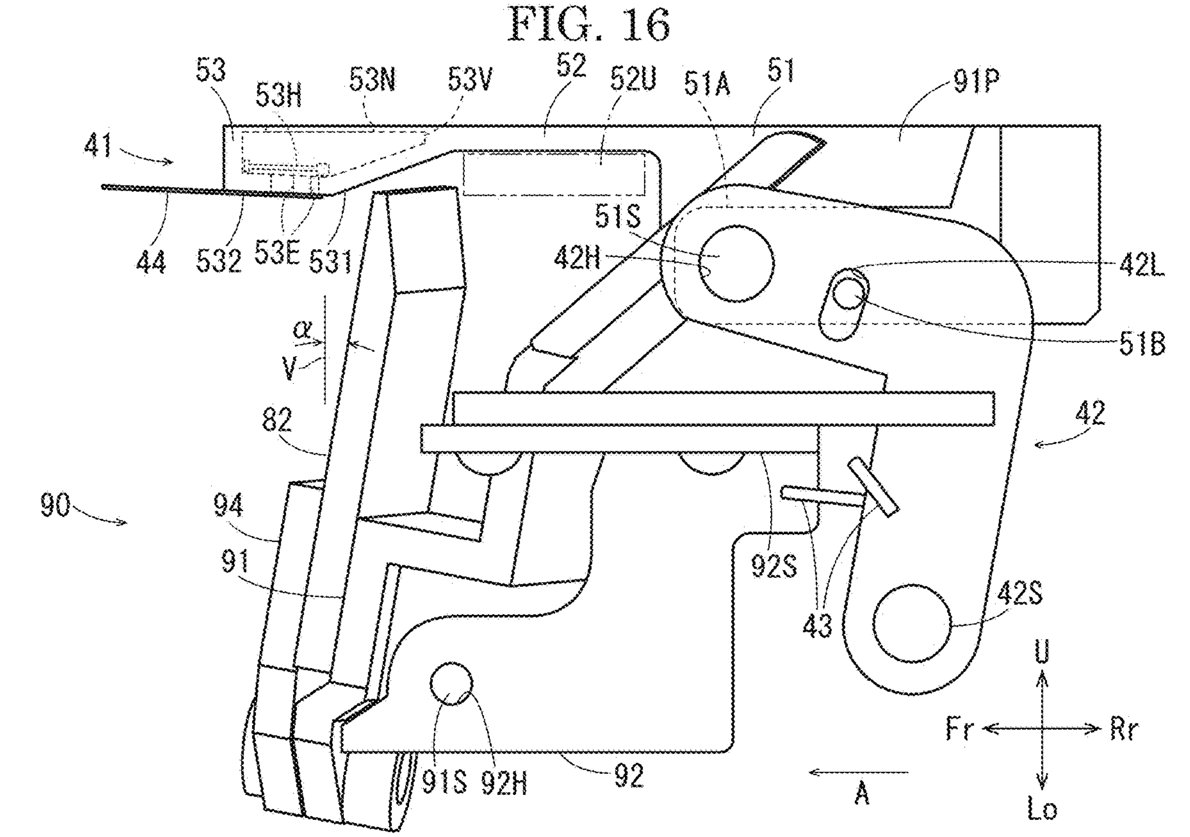
FIG. 16 is a right side view showing the cleaning liquid supply part and the blade unit according to the embodiment of the present disclosure.
Figure 17:
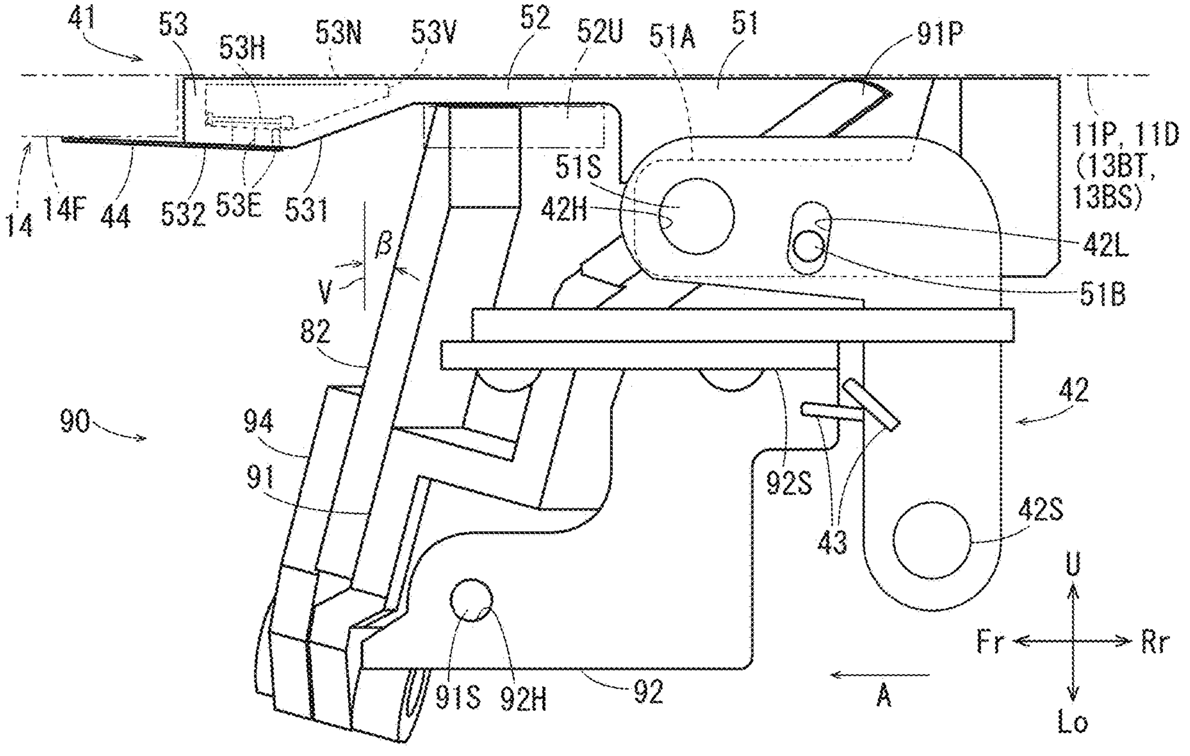
FIG. 17 is a right side view showing the cleaning liquid supply part and the blade unit according to the embodiment of the present disclosure.
Figure 18:
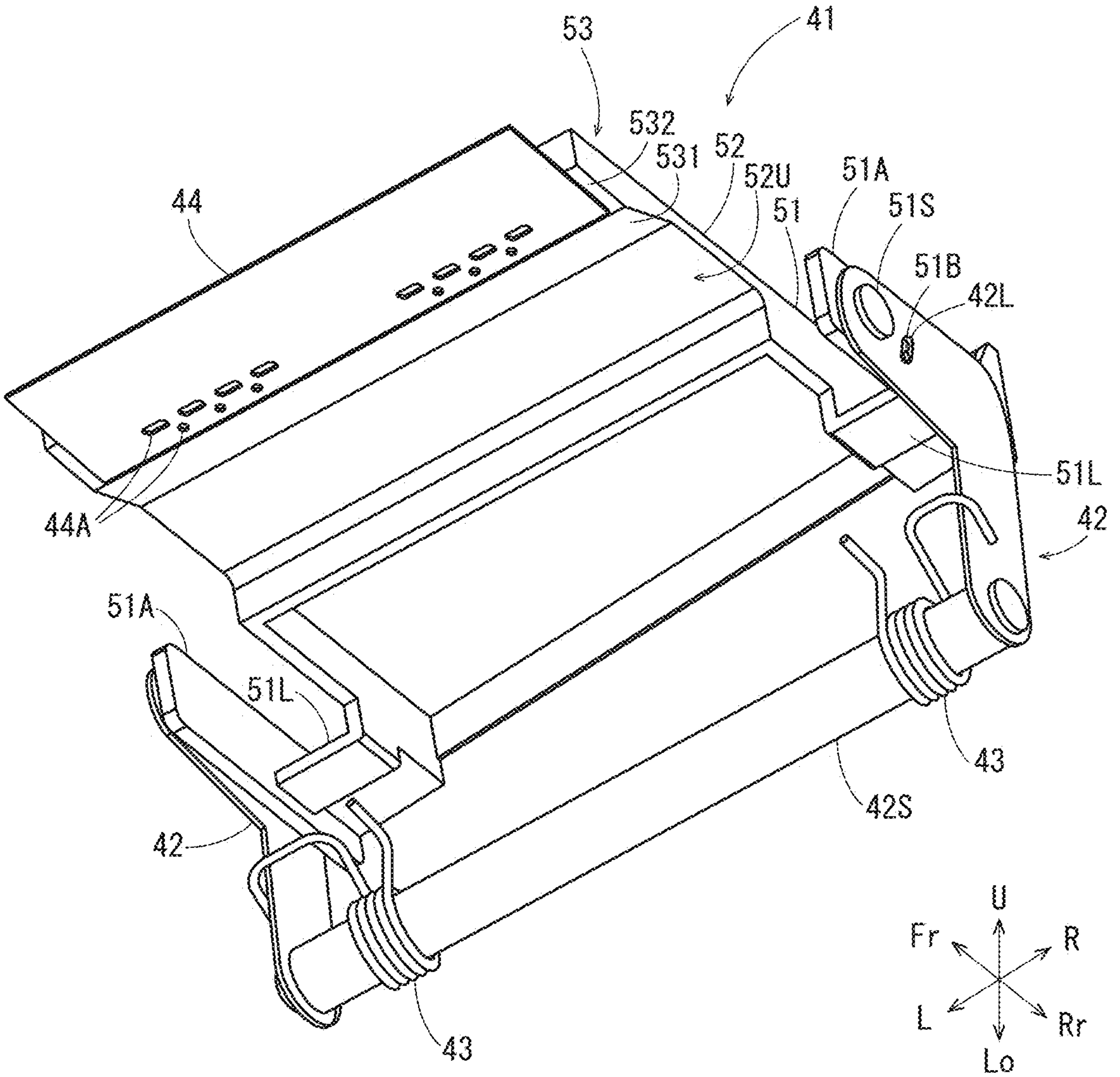
FIG. 18 is a perspective view showing the cleaning liquid supply part according to the embodiment of the present disclosure.
Figure 19:
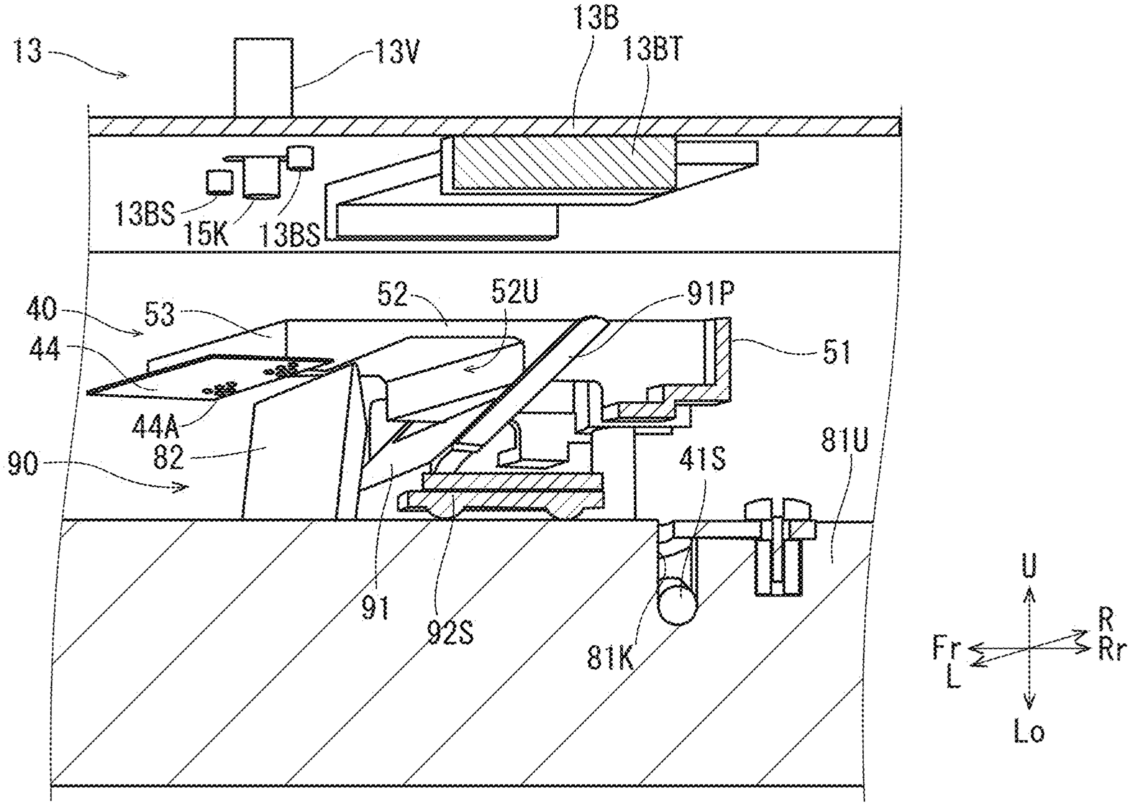
FIG. 19 is a perspective view showing a cross section of the cleaning liquid supply part and the cleaning liquid supply source according to the embodiment of the present disclosure.

[Cleaning Liquid Supply Part] Next, the cleaning liquid supply part 40 will be described. FIG. 15 is a perspective view showing the cleaning liquid supply part 40 and the blade unit 90. FIG. 16 and FIG. 17 are right side views showing the cleaning liquid supply part 40 and the blade unit 90. FIG. 18 is a perspective view showing the cleaning liquid supply part 40. FIG. 19 to FIG. 22 are perspective views showing cross sections of the cleaning liquid supply part 40 and the cleaning liquid supply source 13. The cleaning liquid supply part 40 includes a supply member 41, a link member 42, and a delivery member 44.

[Supply Member] The supply member 41 has a base end part 51, an intermediate part 52, and a storage part 53 in this order from the rear side. The upper surface of the supply member 41 is flat and rectangular when viewed from the upper side. The parallel surface 11P of the head base 11B faces the upper surface of the supply member 41 on the rear side of the nozzle plate 14, and also serves as a pushing down part 11D which pushes down the supply member 41. The pushing down part 11D may be provided as a member separate from the head base 11B.

On the light side surface and the left side surface of the base end part 51, arm support portions 51L protruding leftward and rightward are provided, respectively (see FIG. 18). The left and right arm support portions 51L each has an arm portion 51A protruding forward (see FIG. 16 to FIG. 18). Shaft portion 51S protrudes from the left side surface of the left arm portion 51A and from the right side surface of the right arm portion 51A, respectively. Bosses 51B are provided on the rear sides of the right and left shaft portions 51S, respectively.

A thickness of the intermediate part 52 in the upper-and-lower direction is thinner than that that of the base end part 51 (see FIG. 16 to FIG. 18). The lower surface of the intermediate part 52 is flat. The lower surface of the storage part 53 has a first inclined surface 531 and a second inclined surface 532 provided in front of the first inclined surface 531. The first inclined surface 531 is inclined so that the front side is lower than the rear side (see FIG. 16 and FIG. 17). The second inclined surface 532 is inclined so that the front side is higher than the rear side. The first inclined surface 531 is continuous with the lower surface of the intermediate part 52. Therefore, a larger space (hereinafter, it is referred to as a non-contact space 52U) is formed below the intermediate part 52 than a space below the storage part 53.

The storage part 53 has a hollow structure having a storage space 53V in which the cleaning liquid is stored (see FIG. 16 and FIG. 17). Preferably, a cleaning liquid holding member 53H (see FIG. 21 and FIG. 22) which holds the cleaning liquid, such as a net-like member or a porous member, is provided in the storage space 53V. On the upper surface of the storage part 53, an intake port 53N (see FIG. 15, FIG. 21 and FIG. 22) through which the cleaning liquid is taken in is provided. On the lower surface of the storage part 53, a discharge port 53E (see FIG. 16 and FIG. 17) through which the cleaning liquid is discharged is provided. A thickness of the front end portion of the storage part 53 in the upper-and-lower direction (a distance from the front end portion of the second inclined surface 532 to the upper surface) is slightly larger than a distance from the lower surface of the head base 11B to the nozzle surface 14F.

[Link Member] The link members 42 are provided on the left and right sides of the supply member 41, respectively (FIG. 15 to FIG. 18). The lower portions of the right and left link members 42 are connected by a shaft 42S (see FIG. 18) whose longitudinal direction is along the left-and-right direction. The shaft 42S is rotatably supported by the recess 81U of the waste liquid tray 81. Specifically, the waste liquid tray 81 has notches 81K extending downward from the upper ends of the right and left side walls of the recess 81U (see FIG. 19 and FIG. 20). Both right and left end portions of the shaft 42S are supported by the notches 81K. The link member 42 is turnable around the shaft 42S.

Shaft holes 42H into which the shaft portions 51S of the supply member 41 are inserted are provided in the upper portions of the right and left link members 42, respectively (see FIG. 16 to FIG. 18). The shaft hole 42H is disposed in front of the shaft 42S. A long hole 42L into which the boss 51B of the supply member 41 is inserted is provided on the rear side of the shaft hole 42H. The supply member 41 is turnable with respect to the link member 42 around the shaft portions 51S within a range in the longitudinal direction of the long hole 42L (see FIG. and FIG. 17).

[Second Biasing Member] The link member 42 is provided with a second biasing member 43 (see FIG. 18). Specifically, the second biasing member 43 is a torsion coil spring, and is wound around the shaft 42S. One end of the second biasing member 43 is engaged with the holder 92, and the other end is engaged with the link member 42 (see FIG. 16 and FIG. 17). The second biasing member 43 biases the link member 42 in the clockwise direction in FIG. 16 and FIG. 17. In other words, the second biasing member 43 biases the supply member 41 in a direction closer to the inkjet head 12. The second biasing member 43 may be a plate spring, a compression coil spring, or the like.

[Delivery Member] The delivery member 44 is joined on the second inclined surface 532. The delivery member 44 has the same inclination angle as the second inclined surface 532. The delivery member 44 is a rectangular sheet-like member made of resin or the like, and has flexibility. The front end portion of the delivery member 44 protrudes forward from the front end portion of the storage part 53. The delivery member 44 is provided with an ejection port 44A at a position corresponding to the discharge port 53E of the storage part 53 (see FIG. 18).

[Cleaning Liquid Supply Source] The cleaning liquid supply source 13 (see FIG. 7) supplies the cleaning liquid to the supply member 41. The cleaning liquid is a liquid containing water as a main component. The cleaning liquid supply source 13 includes a tank 13T, a pump 13P, a supply flow pass 13C, and a support plate 13B. The cleaning liquid is stored in the tank 13T. The supply flow pass 13C is branched into three on the downstream side of the pump 13P. Each of the branched supply flow passes 13C is connected to a valve 13V. The valve 13V is, for example, a check valve. The three valves 13V are disposed above the intake ports 53N of the supply member 41. The supply flow pass 13C and the valve 13V are supported by the support plate 13B. The valve 13V passes through the support plate 13B, and the discharge port of the valve 13V protrudes from the lower surface of the support plate 13B.

Supply source lifting devices 13L (see FIG. 7) are provided on the front side and the rear side of the support plate 13B, respectively. The supply source lifting device 13L is constituted of, for example, a cam mechanism and a ball screw. The supply source lifting device 13L lifts and lowers the support plate 13B to a supply position (see FIG. 23(A)) and a retracted position (see FIG. 23(B)). The supply position is a position where the discharge ports of the valves 13V are inserted into the intake ports 53N (see FIG. 20 and FIG. 22). The retracted position is a position where the discharge ports of the valves 13V are retracted upward from the intake ports 53N (see FIG. 19 and FIG. 21).

On the lower surface of the support plate 13B, a protrusion 13BT protruding downward is provided at a position corresponding to the protruding portion 91P of the protruding member 91 (see FIG. 19 to FIG. 22). On the lower surface of the support plate 13B, protrusions 13BS protruding downward are provided on the left and right sides of the valve 13V, respectively (see FIG. 19 and FIG. 20).

[Outline of Operation of Wipe Unit] Next, an outline of the operation of the wipe unit 32 will be described. FIG. 24 is a plan view showing the operation of the wipe unit 32. FIG. 25 to FIG. 30 are right side views showing the operation of the wipe unit 32. Here, the outline of the operation of the wipe unit 32 will be described, and the operations of the protruding member 91 and the supply member 41 will be described later.

Figure 23A:
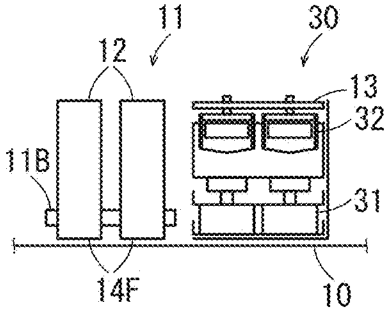
FIG. 23A to FIG. 23G are front views showing an operation of the maintenance device according to the embodiment of the present disclosure.
Figure 24A:
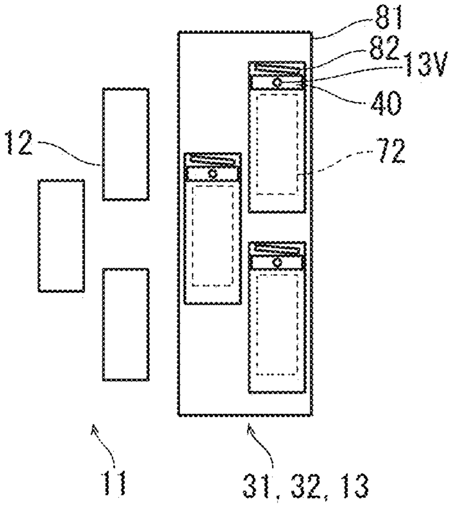
FIG. 24A to FIG. 24D are plan views showing an operation of the wipe unit according to the embodiment of the present disclosure.

Hereinafter, the state shown in FIG. 23(A) and FIG. 24(A) will be described as the initial state. In the initial state, the head unit 11 is positioned at the image forming position (see FIG. 23(A)), the cap unit 31 is positioned at the home position, the wipe unit 32 is positioned at the home position and the contact position, and the cleaning liquid supply source 13 is positioned at the supply position. The blade 82 is positioned at the wiping operation start position (see FIG. 24(A)). A predetermined amount of the cleaning liquid is supplied from the cleaning liquid supply source 13 to the cleaning liquid supply part 40. The control part 2 performs the following processing at a predetermined timing. The predetermined timing is, for example, a timing in which an increase of a viscosity of the ink in the nozzle 14N is expected, and more specifically, a case in which a period in which the image forming job is not executed continues for a predetermined period.

Figure 23B:
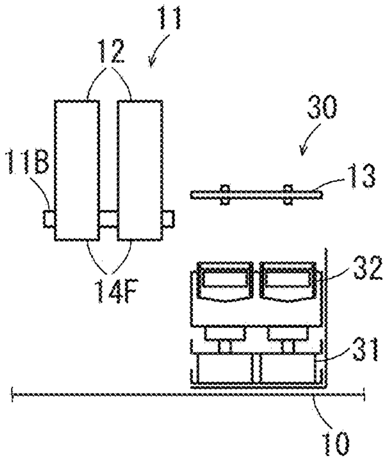

First, the control part 2 operates the head lifting device 11L to lift the head unit 11 to the retracted position (see FIG. 23(B)). Further, the control part 2 operates the supply source lifting device 13L to lift the cleaning liquid supply source 13 to the retracted position.

Figure 23C:
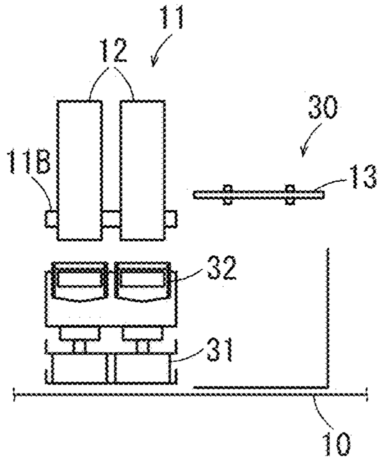
Figure 23D:
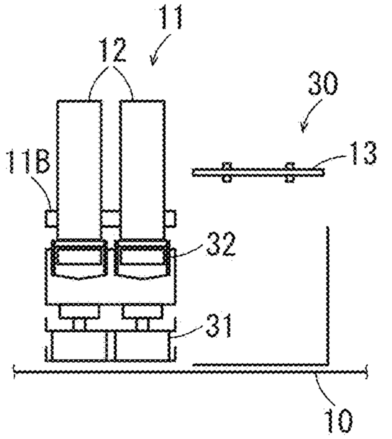
Figure 24B:
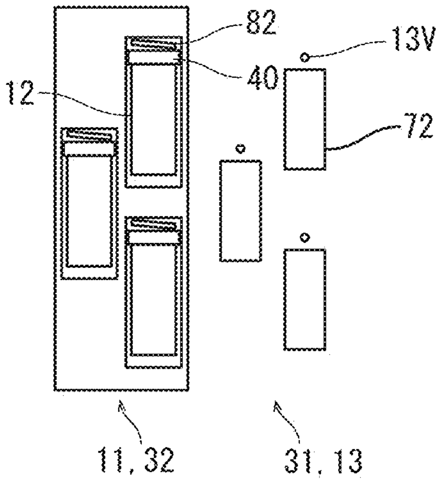
Figure 24C:
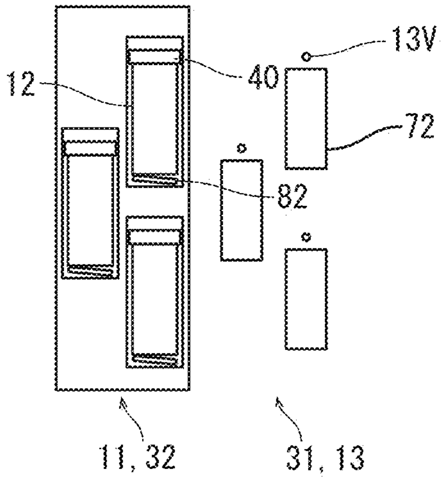
Figure 24D:
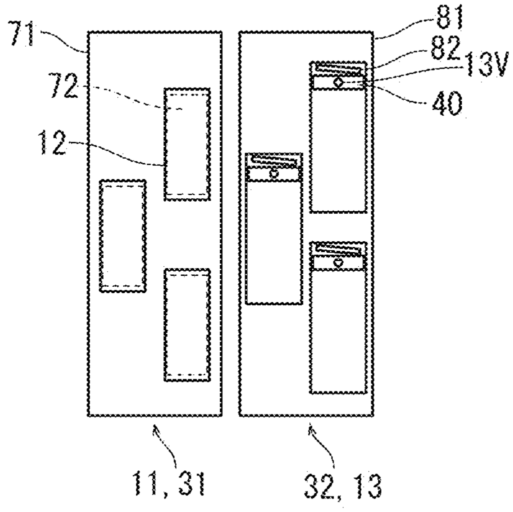
Figure 24D:
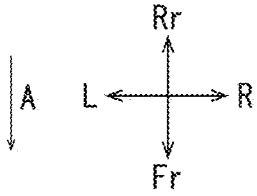
Figure 25:
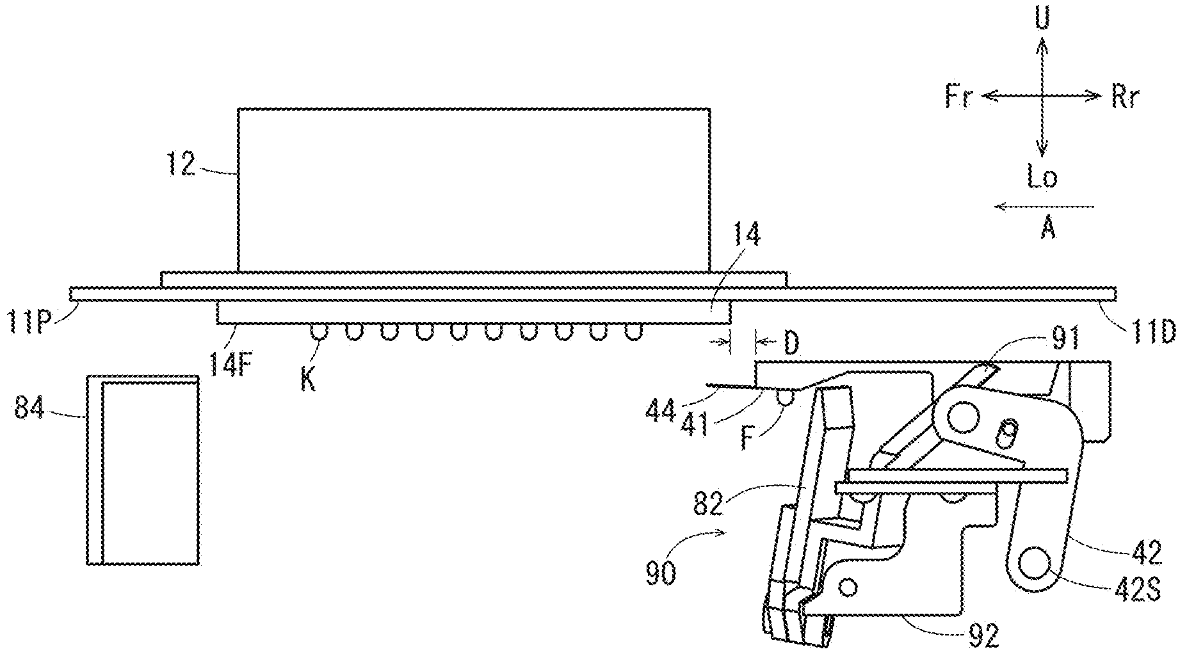
FIG. 25 is a right side view showing the operation of the wipe unit according to the embodiment of the present disclosure.

Next, the control part 2 operates the cap sliding device 34 to slide the cap unit 31 to the maintenance position (see FIG. 23(C), FIG. 24(B) and FIG. 25). At this time, since the wipe unit 32 is placed on the cap unit 31, the wipe unit 32 slides to the maintenance position together with the cap unit 31. Next, the control part 2 operates the head lifting device 11L to lower the head unit 11 to a height (hereinafter, it is referred to as a wiping position) at which the wiping operation is performed (see FIG. 23(D) and FIG. 26).

Next, after the control part 2 operates the inkjet head 12 to eject a predetermined amount of the ink from the inkjet head 12, the control part 2 operates the carriage driving device 36 to slide the blade 82 forward along the nozzle surface 14F (see FIG. 24(C), FIG. 27, FIG. 28 and FIG. 29). The blade 82 scrapes the cleaning liquid F swelling from the ejection port 44A (see FIG. 27) and moves forward along the nozzle surface 14F (see FIG. 28 and FIG. 29). On the nozzle surface 14F, the remaining ink K is diluted by the cleaning liquid F carried by the blade 82. The waste liquid containing the remaining ink K and the cleaning liquid F is scraped by the blade 82 and falls into the recess 81U.

Figure 30:
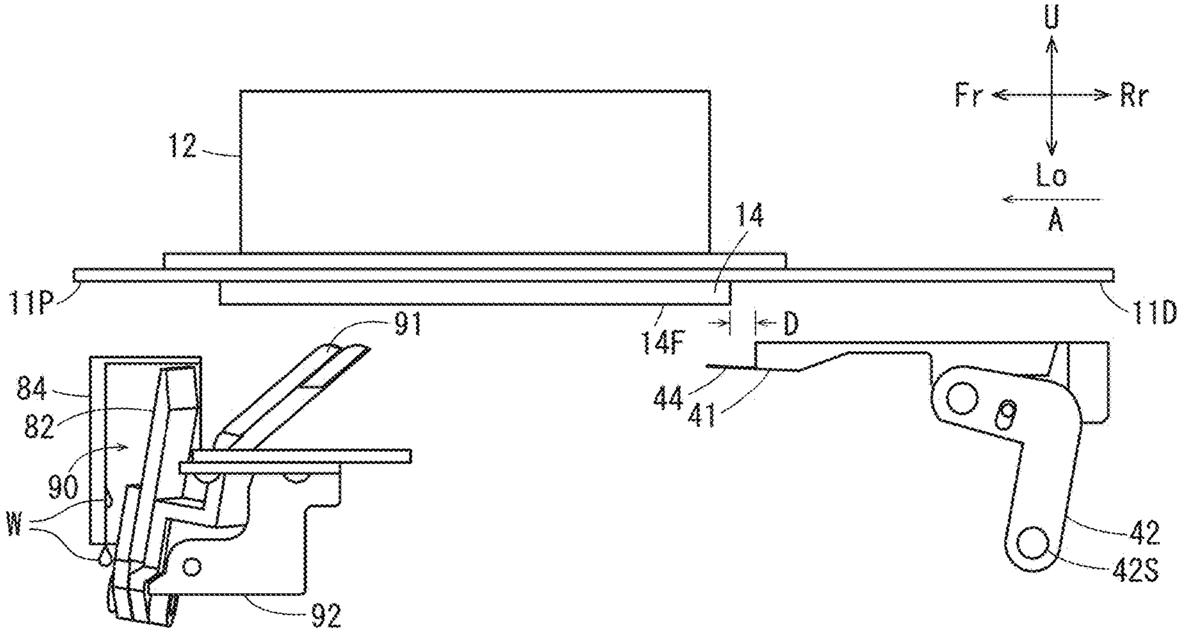
FIG. 30 is a right side view showing the operation of the wipe unit according to the embodiment of the present disclosure.

Next, the control part 2 operates the head lifting device 11L to lift the head unit 11 to the retracted position (see FIG. 23(C) and FIG. 30). Next, the control part 2 operates the carriage driving device 36 to return the blade 82 to the wiping operation start position (see FIG. 24(B) and FIG. 25). Next, the control part 2 operates the cap sliding device 34 to slide the cap unit 31 and the wipe unit 32 to the home position (see FIG. 23(B) and FIG. 24(A)).

Figure 23E:
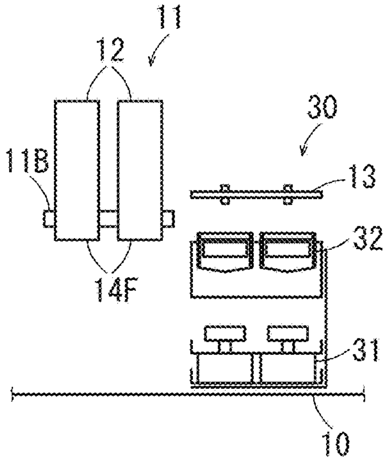

Next, the control part 2 operates the wipe lifting device 35 to lift the wipe unit 32 to the separated position (see FIG. 23(E)). Next, the control part 2 operates the cap sliding device 34 to slide the cap unit 31 to the maintenance position (see FIG. 23(F) and FIG. 24(D)). At this time, since the wipe unit 32 is separated from the cap unit 31, the wipe unit 32 remains at the home position and only the cap unit 31 slides to the maintenance position.

Next, the control part 2 operates the head lifting device 11L to lower the head unit 11 to a height (hereinafter, it is referred to as the capping position) at which the nozzle surface 14F is in contact with the caps 72 (see FIG. 23(G)). Thus, the caps 72 are attached on the nozzle surface 14F.

Figure 23F:
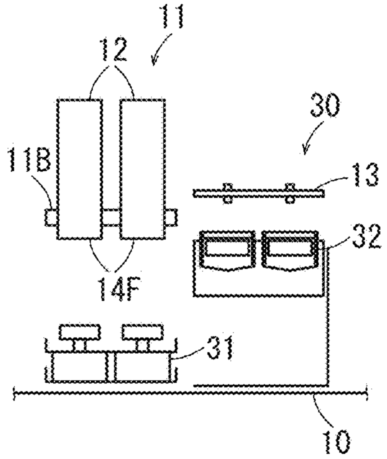
Figure 23G:
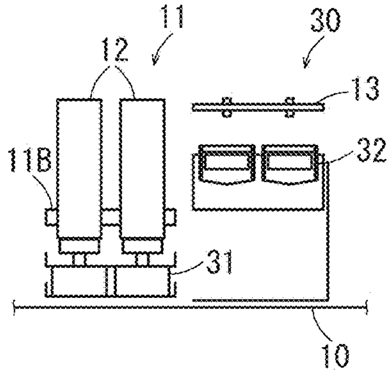
Figure 23G:
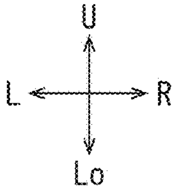

When the image forming job is executed, the control part 2 operates the head lifting device 11L to lift the head unit 11 to the retracted position (see FIG. 23(F)), operates the cap sliding device 34 to slide the cap unit 31 to the home position (see FIG. 23(E)), and operates the wipe lifting device 35 to lower the wipe unit 32 to the contact position (see FIG. 23(B)). Then, the control part 2 operates the head lifting device 11L to lower the head unit 11 to the image forming position (see FIG. 23(A)), and executes the image forming job.

[Operations of Protruding Member and Supply Member] Next, the operations of the protruding member 91 and the supply member 41 will be described. FIG. 16 shows a state in which the protruding member 91 and the supply member 41 are not pushed down (hereinafter, it is referred to as a non-pushed down state). On the other hand, FIG. 17 shows a state in which the protruding member 91 is pushed down by the parallel surface 11P or the protrusion 13BT and the supply member 41 is pushed down by the pushing down part 11D or the protrusion 13BS (hereinafter, it is referred to as a pushed down state). The first biasing member 93 biases the protruding member 91 in the counterclockwise direction in FIG. 16 and FIG. 17. The second biasing member 43 biases the link member 42 in the clockwise direction.

[Non-pushed Down State] When the wipe unit 32 is positioned at the home position and the cleaning liquid supply source 13 is lifted to the retracted position, it is turned to the non-pushed down state (see FIG. 19, FIG. 21, FIG. 23(B), FIG. 23(E), FIG. 23(F) and FIG. (G)). In addition, when the wipe unit 32 is positioned at the maintenance position and the head unit 11 is lifted to the retracted position, it is turned to the non-pushed down state (see FIG. 23(C)).

Figure 20:
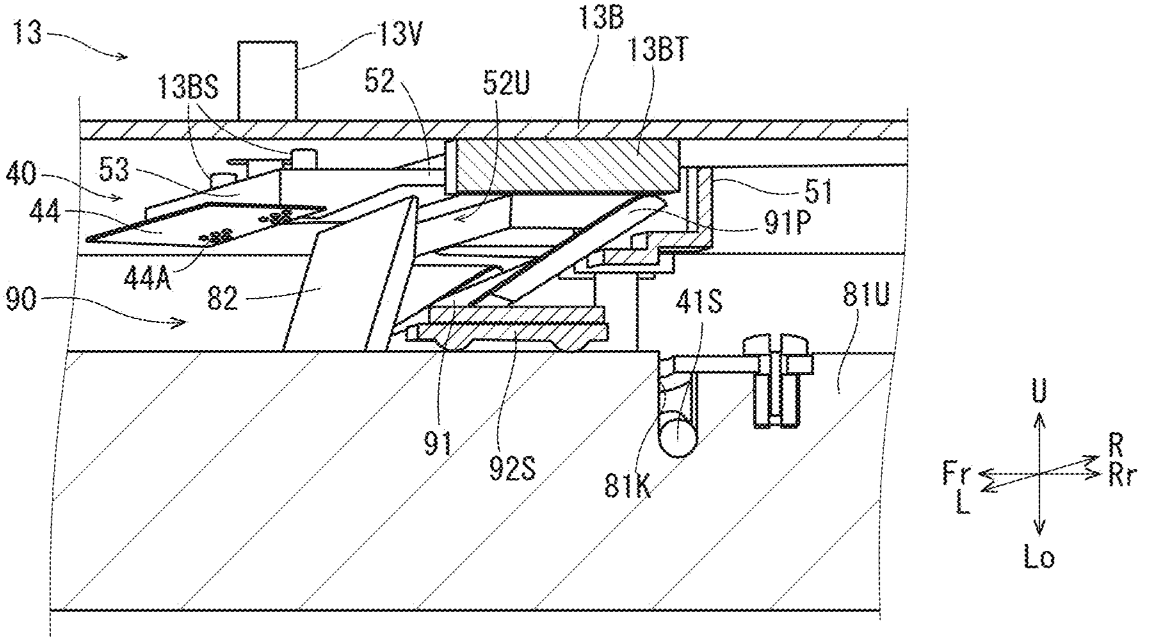
FIG. 20 is a perspective view showing a cross section of the cleaning liquid supply part and the cleaning liquid supply source according to the embodiment of the present disclosure.
Figure 21:
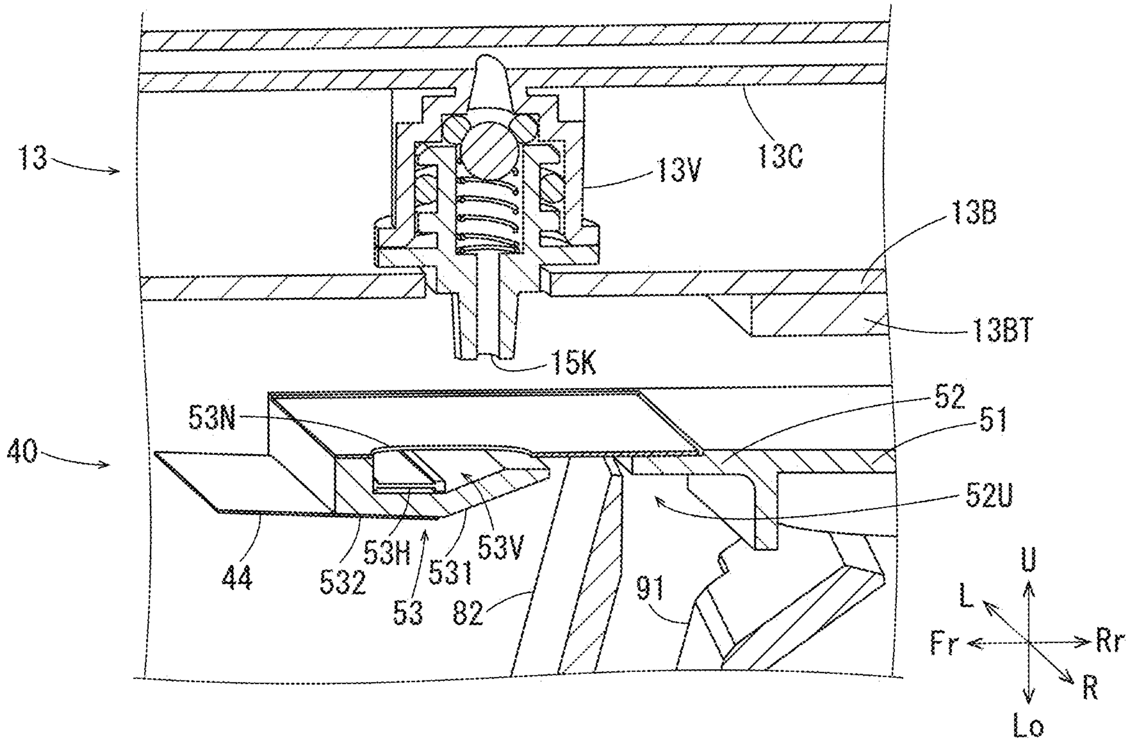
FIG. 21 is a perspective view showing a cross section of the cleaning liquid supply part and the cleaning liquid supply source according to the embodiment of the present disclosure.
Figure 22:
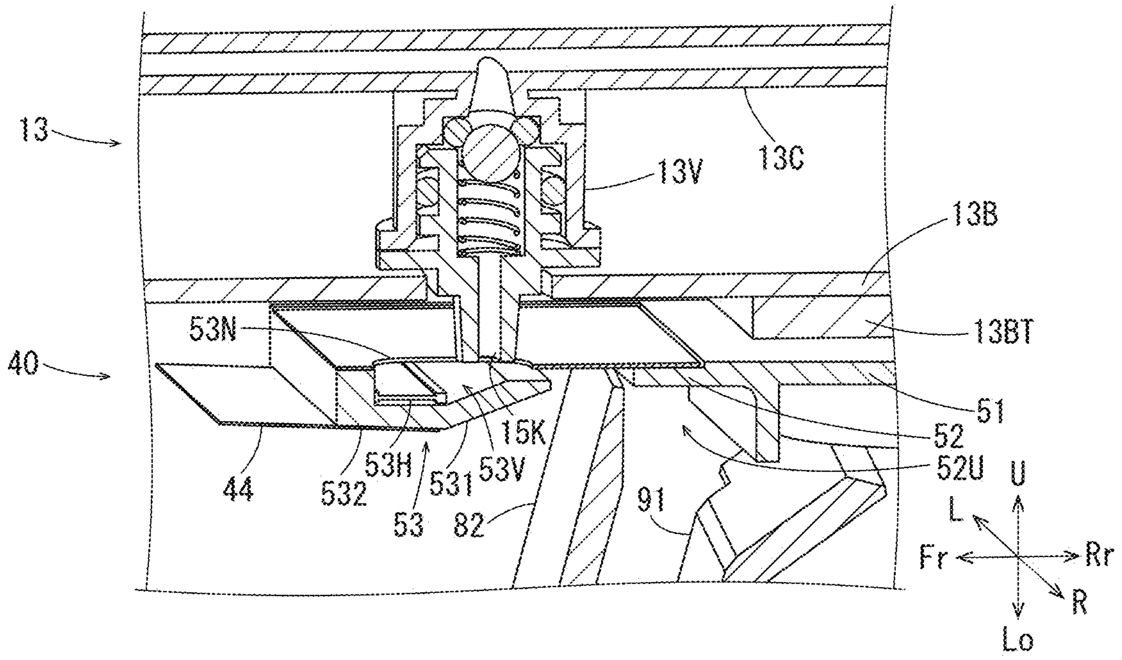
FIG. 22 is a perspective view showing a cross section of the cleaning liquid supply part and the cleaning liquid supply source according to the embodiment of the present disclosure.

[Pushed Down State] On the other hand, when the wipe unit 32 is positioned at the home position and the cleaning liquid supply source 13 is lowered to the supply position, it is turned to the pushed down state (see FIG. 20, FIG. 22 and FIG. 23(A)). Specifically, when the cleaning liquid supply source 13 is lowered (see FIG. 17, FIG. 20 and FIG. 22) from the non-pushed down state (see FIG. 16, FIG. 19 and FIG. 21), the protrusion 13BT pushes down the protruding portion 91P against the first biasing member 93, and the protrusion 13BS pushes down the supply member 41 against the second biasing member 43. At this time, the discharge port of the valve 13V is inserted into the intake port 53N of the supply member 41 (see FIG. 22), and it becomes possible to supply the cleaning liquid from the cleaning liquid supply source 13 to the cleaning liquid supply part 40.

Also, when the wipe unit 32 is positioned at the maintenance position and the head unit 11 is lowered to the wiping position, it is turned to the pushed down state (see FIG. 23(D)). When the head unit 11 is lowered (see FIG. 17) from the non-pushed down state (see FIG. 16), the parallel surface 11P pushes down the protruding portion 91P against the first biasing member 93, and the pushing down part 11D pushes down the supply member 41 against the second biasing member 43.

When it is transited from the non-pushed down state to the pushed down state, the protruding portion 91P is pushed down to turn the blade 82 in the clockwise direction. Therefore, an inclination angle β of the front surface of the blade 82 with respect to the vertical line V in the pushed down state (see FIG. 17) is larger than an inclination angle α in the non-pushed down state (see FIG. 16). When the supply member 41 is pushed down, the link member 42 is turned in the counterclockwise direction. Therefore, in the pushed down state, the supply member 41 moves forward and downward as compared with the non-pushed down state.

When focusing on the tip end portion of the blade 82, in the non-pushed down state, the tip end portion of the blade 82 is positioned below the first inclined surface 531 of the supply member 41. On the other hand, in the pushed down state, the tip end portion of the blade 82 is moved rearward and downward and the supply member 41 is moved forward and downward, but the tip end portion of the blade 82 enters the non-contact space 52U below the intermediate part 52 of the supply member 41, so that interference between the blade 82 and the supply member 41 is avoided.

[Wiping Operation] Next, the wiping operation will be described in detail. When the head unit 11 is lifted to the retracted position and the wipe unit 32 is slid to the maintenance position (see FIG. 23(C), FIG. 24(B) and FIG. 25), the protruding member 91 and the supply member 41 are in the non-pushed down state (see FIG. 16). At this time, the rear end surface of the nozzle plate 14 and the front end surface of the supply member 41 are spaced apart in the front-and-rear direction by a distance D (see FIG. 25). The cleaning liquid F is swollen from the ejection port 44A (see FIG. 18) of the delivery member 44 (see FIG. 25). The remaining ink K adheres to the nozzle surface 14F (see FIG. 25).

Figure 26:
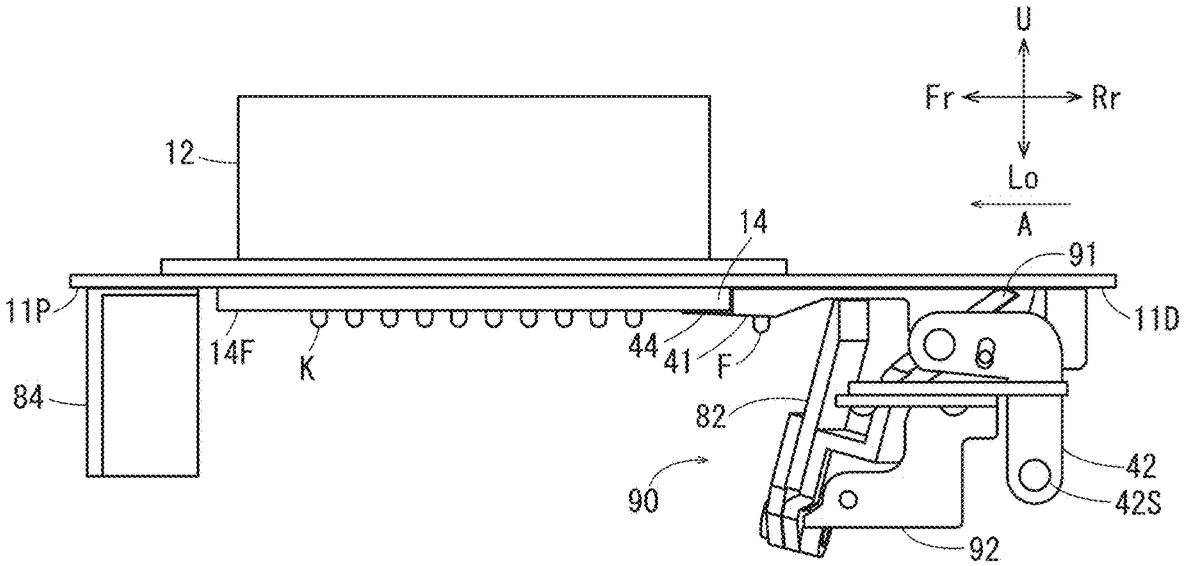
FIG. 26 is a right side view showing the operation of the wipe unit according to the embodiment of the present disclosure.

Next, the control part 2 operates the head lifting device 11L to lower the head unit 11 to the wiping position (see FIG. 23(D) and FIG. 26). Then, since the parallel surface 11P pushes down the protruding member 91 and the supply member 41, the protruding member 91 and the supply member 41 are in the pushed down state (see FIG. 17). At this time, the blade 82 is turned from the inclination angle α to the inclination angle β. Since the supply member 41 is moved forward, a distance between the front end surface of the supply member 41 and the rear end surface of the nozzle plate 14 is decreased. At this time, the front end surface of the supply member 41 may be in contact with the rear end surface of the nozzle plate 14. In addition, since the delivery member 44 is moved below the nozzle surface 14F and at least the front end portion of the upper surface of the delivery member 44 comes into contact with the nozzle surface 14F, a step between the second inclined surface 532 and the nozzle surface 14F is eliminated.

Figure 27:
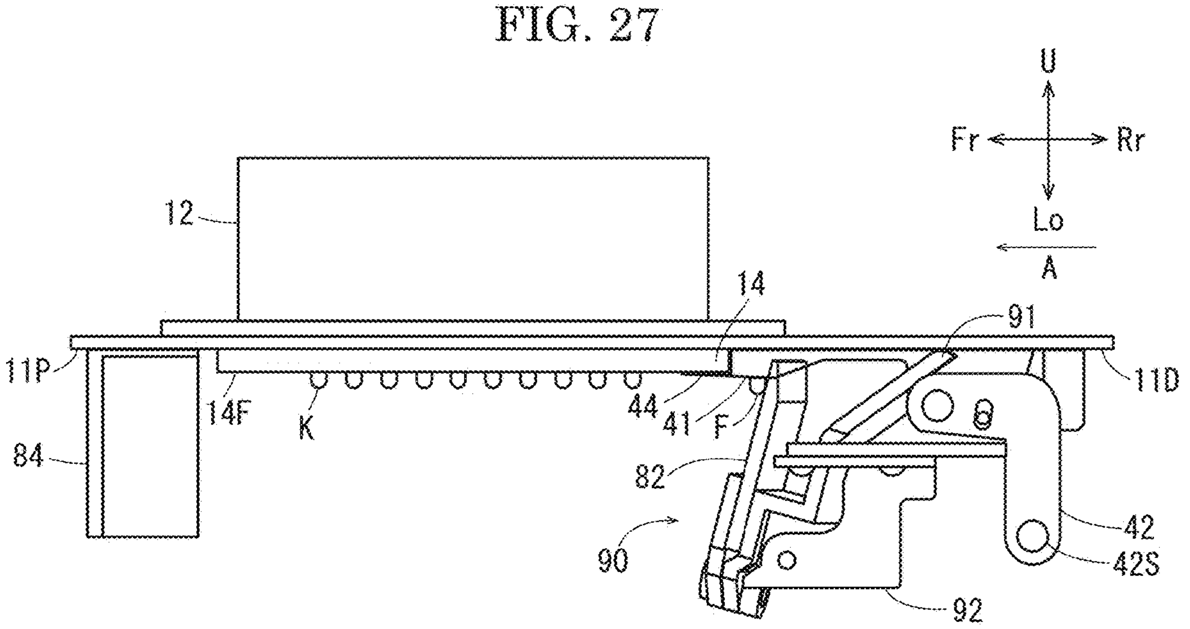
FIG. 27 is a right side view showing the operation of the wipe unit according to the embodiment of the present disclosure.
Figure 28:
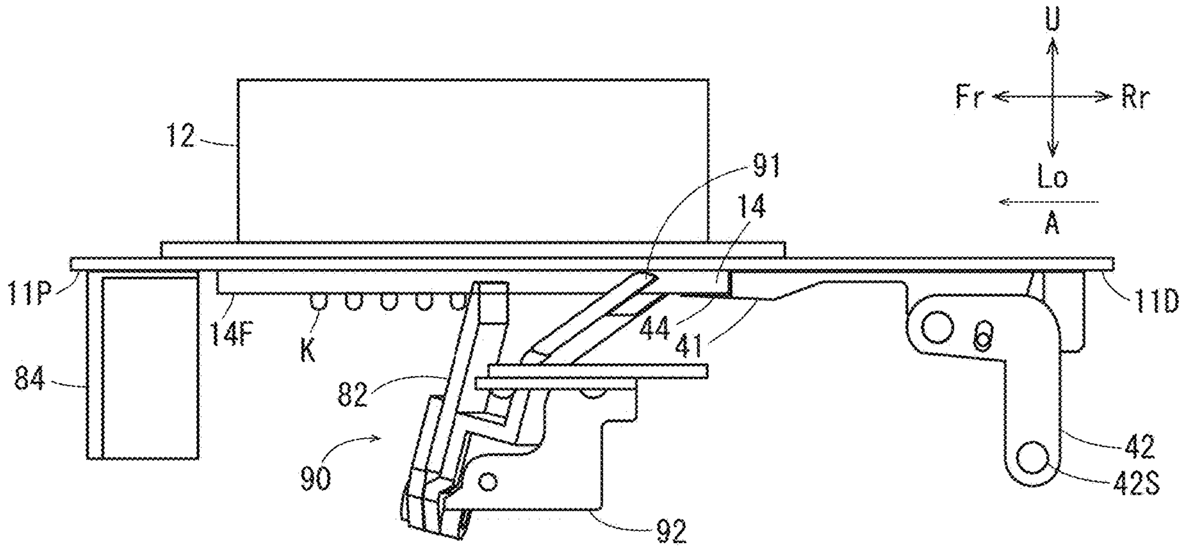
FIG. 28 is a right side view showing the operation of the wipe unit according to the embodiment of the present disclosure.
Figure 29:
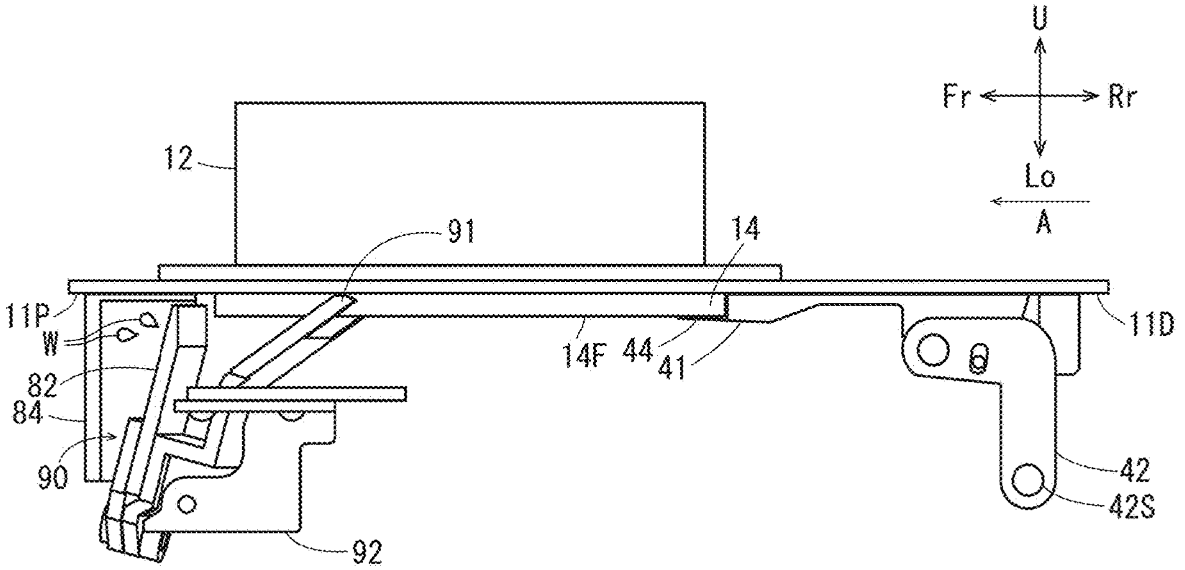
FIG. 29 is a right side view showing the operation of the wipe unit according to the embodiment of the present disclosure.

Next, the control part 2 operates the inkjet head 12 to eject a predetermined amount of the ink from the inkjet head 12. By this operation, the ink having increased viscosity is discharged from the nozzle 14N. Next, the control part 2 operates the carriage driving device 36 to slide the blade 82 forward along the nozzle surface 14F (see FIG. 24(C)). The blade 82 scrapes the cleaning liquid F swelling from the ejection port 44A (see FIG. 27), moves along the lower surface of the delivery member 44 to the nozzle surface 14F, and then moves forward along the nozzle surface 14F (see FIG. 28). In FIG. 27 and FIG. 28, the tip end portion of the blade 82 overlaps the supply member 41 and the nozzle plate 14, but actually, the tip end portion of the blade 82 is bent rearward.

When the blade 82 moves forward along the nozzle surface 14F, since the blade 82 moves forward in a state where the protruding member 91 is in contact with the parallel surface 11P, an inclination angle of the blade 82 is kept constant. Therefore, the blade 82 is pressed against the nozzle surface 14F with a constant load. The blade 82 is pressed against the nozzle surface 14F mainly by the elastic force of the first biasing member 93. An elastic force of the first biasing member 93 is adjusted so as to minimize the deflection of the blade 82.

On the nozzle surface 14F, the remaining ink K is diluted by the cleaning liquid F carried by the blade 82. The waste liquid containing the remaining ink K and the cleaning liquid F is scraped off by the blade 82 and flows down along the front and rear surfaces of the blade 82. The waste liquid W flowing down along the rear surface of the blade 82 passes through the through-hole 91A of the protruding member 91, and falls into the recess 81U (see FIG. 11). The waste liquid W flowing down along the front surface of the blade 82 passes through the front surface of the fixing member 94, is collected in the center in the left-and-right direction along the lower edge portion of the fixing member 94 and the lower edge portion of the protruding member 91, and falls into the recess 81U.

In parallel with the blade 82 passing through the front end portion of the nozzle surface 14F (see FIG. 29), the control part 2 operates the head lifting device 11L to lift the head unit 11 to the retracted position (see FIG. 30). At this time, since the head base 11B is also lifted, the protruding member 91 and the supply member 41 return to the non-pushed down state. Further, since the blade 82 is separated from the nozzle surface 14F, the deflection deformation of the blade 82 is eliminated. By this operation, the waste liquid W is discharged from the blade 82 toward the receiving member 84. The waste liquid W received by the receiving member 84 flows down along the inner surface of the receiving member 84 and falls into the recess 81U.

If the structure (the protruding member 91, the holder 92, the first biasing member 93, and the others) for changing the inclination angle of the blade 82 is not provided, the blade 82 is pressed against the nozzle surface 14F exclusively by the elastic force due to the deflection deformation of the blade 82 itself. Therefore, when the tip end portion of the blade 82 passes through the front end portion of the nozzle surface 14F, the deflection of the blade 82 is rapidly returned, and there is a possibility that the waste liquid W is scattered. On the other hand, in the present embodiment, the deflection of the blade 82 is suppressed to be smaller than in the case where the structure for changing the inclination angle of the blade 82 is not provided. Further, since the recovery of the inclination of the blade 82 is performed in parallel with the elimination of the deflection deformation, the waste liquid W is mainly discharged forward and received by the receiving member 84, thereby suppressing the scattering of the waste liquid W.

[Modified Example] In the case where the blade 82 is cleaned using the supply member 41 exemplified in the above embodiment, the configuration is considered in which the cleaning liquid F is supplied to the blade 82 positioned at the wiping start position and the waste liquid W is removed from the blade 82 by some method. However, the waste liquid W may scatter and adhere to the supply member 41, and the contaminated cleaning liquid F may be supplied to the blade 82 during the wiping operation. Therefore, the modified example includes the following configuration.

Figure 31:
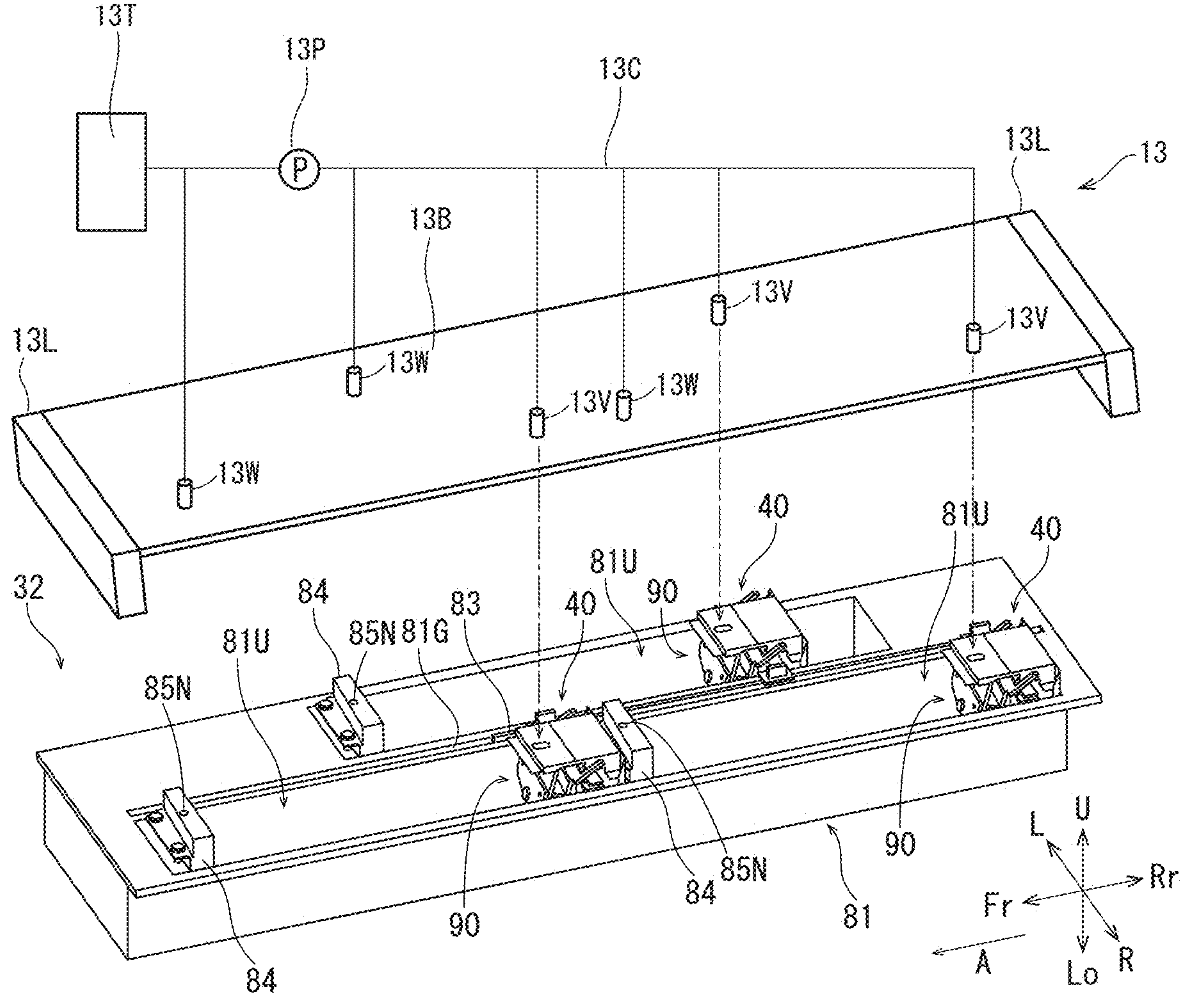
FIG. 31 is a perspective view showing the cleaning liquid supply source according to a modified example of the embodiment of the present embodiment.
Figure 32:
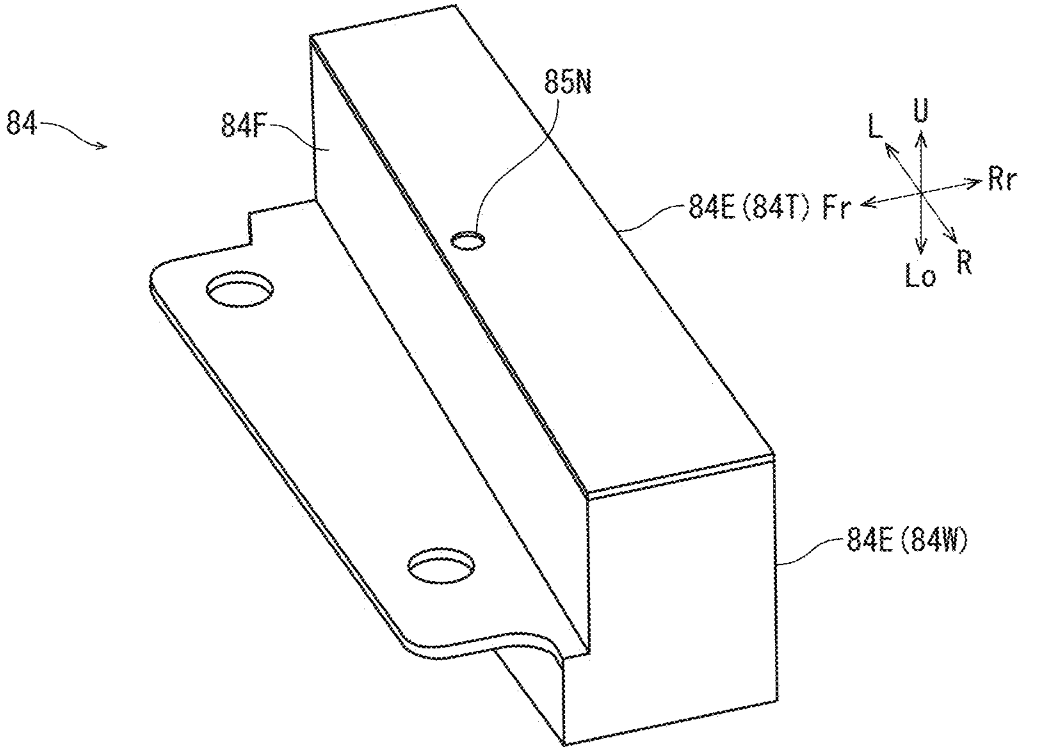
FIG. 32 is a perspective view showing the receiving member according to the modified example of the embodiment of the present embodiment.
Figure 33:
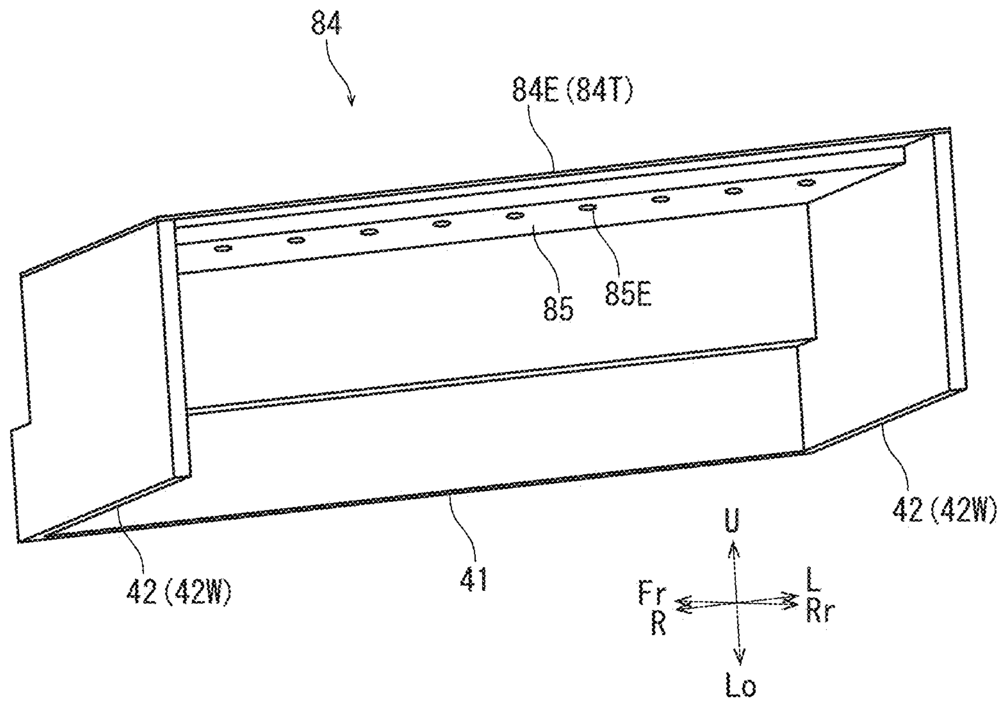
FIG. 33 is a perspective view showing the receiving member according to the modified example of the embodiment of the present embodiment.
Figure 34:
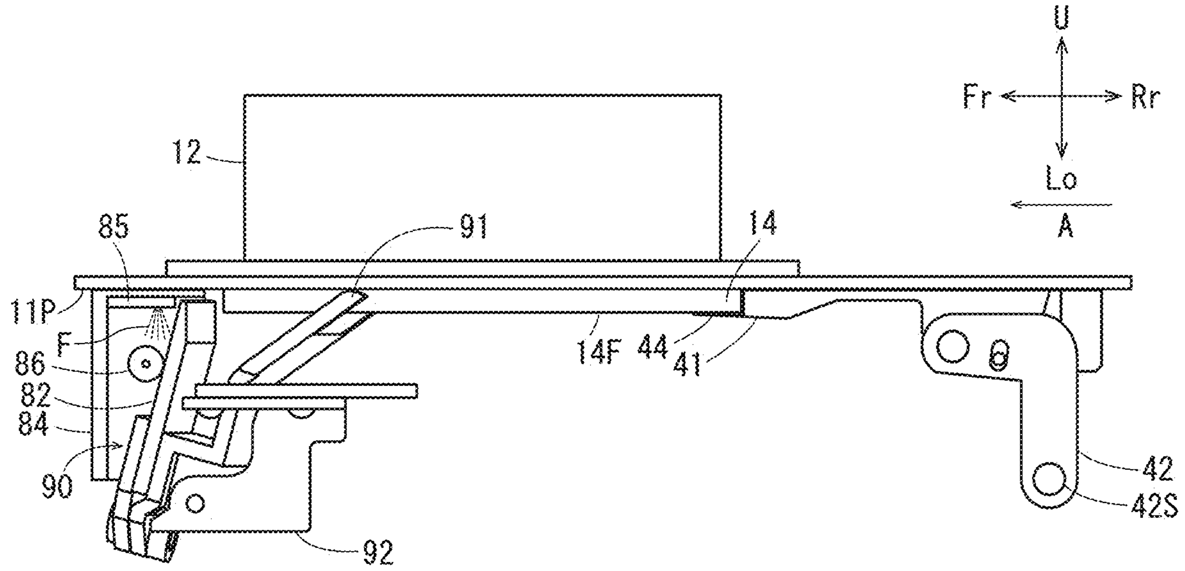
FIG. 34 is a right side view showing the wipe unit to the modified example of the embodiment of the present embodiment.

FIG. 31 is a perspective view showing the cleaning liquid supply source 13. FIG. 32 and FIG. 33 are perspective views showing the receiving member 84. FIG. 34 is a right side view showing the operation of the wipe unit 32. The receiving member 84 includes the supply member 85. The supply member 85 is provided on the ceiling portion 84T of the receiving member 84. A space (not shown) for storing the cleaning liquid F is provided inside the supply member 85. On the upper surface of the supply member 85, the intake port 85N for taking in the cleaning liquid F is provided. The intake port 85N penetrates the ceiling portion 84T. A discharge port 85E for discharging the cleaning liquid F is provided on the lower surface of the supply member 85. The discharge port 85E is provided at a plurality of positions in the left-and-right direction.

The supply flow pass 13C of the cleaning liquid supply source 13 is branched into six flow passes on the downstream side of the pump 13P. Three supply flow passes 13C are connected to the valves 13V of the above embodiment, and the other three supply flow passes 13C are connected to the valve 13W. The valve 13W is, for example, a check valve. The three valves 13W are positioned above the intake ports 85N of the supply member 85, respectively.

At the home position, the cleaning liquid F is supplied from the cleaning liquid supply source 13 to the supply member 41. At the maintenance position, the cleaning liquid F is supplied from the supply member 41 to the blade 82 after the wiping operation is completed. The supply of the cleaning liquid F from the supply member 41 to the blade 82 may be performed at the maintenance position or after the wipe unit 32 is moved to the home position.

The receiving member 84 preferably includes a removing member 86. The removing member 86 scrapes the waste liquid W by rubbing the front surface of the blade 82, for example. The removing member 86 may be a member that rotates around an axis, or a member that reciprocates in the left-and-right direction or the upper-and-lower direction. The removing member 86 may be a brush or a roller made of sponge. In parallel with the supply of the cleaning liquid F from the supply member 85 to the blade 82, the removing member 86 removes the waste liquid.

The supply member 85 preferably includes a configuration (not shown) for jetting the cleaning liquid F. For example, each discharge port 85E may be provided with a nozzle, and the cleaning liquid F pressurized by the pump may be ejected from the nozzle.

The inkjet recording apparatus 1 according to the modified example includes the blade 82, the first supply member (the supply member 41), and the second supply member (the supply member 85). The blade 82 performs the wiping operation along the nozzle surface 14F of the inkjet head 12. The first supply member is provided on the rear side of the nozzle surface 14F in the moving direction A in the wiping operation, and supplies the cleaning liquid F to the blade 82. The second supply member is provided on the front side of the nozzle surface 14F in the moving direction A in the wiping operation, and supplies the cleaning liquid F to the blade 82. According to this configuration, it becomes possible to clean the blade 82 without contaminating the cleaning liquid F for cleaning the nozzle surface 14F.

The inkjet recording apparatus 1 according to the modified example includes the wipe unit 32 and the wipe sliding device (the cap sliding device 34). The wipe unit 32*c* includes the blade 82, the first supply member, the second supply member, and the waste liquid tray 81 which receives the waste liquid W containing the cleaning liquid F. The wipe sliding device slides the wipe unit 32 to the maintenance position below the inkjet head 12 and the home position different from the maintenance position. According to this configuration, at the time of the image formation, the first supply member and the second supply member can be separated from the inkjet head 12 by sliding the wipe unit 32 to the home position, so that the sheet can be prevented from being contaminated and the supply member 41 can be prevented from being damaged at the time of the image formation.

Further, in the inkjet recording apparatus 1 according to the modified example, the waste liquid tray 81 is provided with the receiving member 84 for receiving the waste liquid W scattered from the blade 82 on the front side of the nozzle surface 14F in the moving direction A in the wiping operation, and the second supply member is provided on the receiving member 84. According to this configuration, since the second supply member is provided using the receiving member 84, a size of the maintenance device 30 can be made small.

In the inkjet recording apparatus 1 according to the modified example, the receiving member 84 includes the removing member 86 for removing the waste liquid W including the cleaning liquid F from the blade 82. According to this configuration, the cleaning liquid F can be prevented from being contaminated with the waste liquid W during the wiping operation.

The inkjet recording apparatus 1 according to the modified example includes the cleaning liquid supply source 13 which is provided at the home position and supplies the cleaning liquid F to the second supply member. According to this configuration, since the cleaning liquid supply source 13 remains at the home position, the flow pass of the cleaning liquid F can be prevented from being damaged.

In the inkjet recording apparatus 1 according to the present modified example, the second supply member may supply the cleaning liquid F to the blade 82 at the maintenance position. According to this configuration, since the blade 82 can be quickly cleaned after the wiping operation is completed, it is possible to more effectively prevent the ink from sticking to the blade 82. In this case, it is necessary to provide the waste liquid tray 81 with the configuration for jetting the cleaning liquid F.

In the inkjet recording apparatus 1 according to the modified example, the second supply member may supply the cleaning liquid to the blade 82 at the home position. According to this configuration, it is not necessary to provide the waste liquid tray 81 with the configuration for jetting the cleaning liquid F, so that the wipe unit 32 can be reduced in size and weight.

The invention claimed is:

1. An inkjet recording apparatus comprising:

a blade which performs a wiping operation along a nozzle surface of an inkjet head;

a first supply member which is provided on a rear side of the nozzle surface in a moving direction in the wiping operation and supplies a cleaning liquid to the blade;

a second supply member which is provided on a front side of the nozzle surface in the moving direction in the wiping operation and supplies the cleaning liquid to the blade;

a wipe unit which includes the blade, the first supply member, the second supply member, and a waste liquid tray which receives a waste liquid containing the cleaning liquid; and a wipe sliding device which slides the wipe unit to a maintenance position below the inkjet head and a home position different from the maintenance position, wherein the waste liquid tray is provided with a receiving member which receives the waste liquid scattered from the blade on the front side of the nozzle surface in the moving direction in the wiping operation, and the second supply member is provided on the receiving member.

2. The inkjet recording apparatus according to claim 1, comprising:

a cleaning liquid supply source which is provided at the home position and supplies the cleaning liquid to the second supply member.

3. The inkjet recording apparatus according to claim 1, wherein the second supply member supplies the cleaning liquid to the blade at the maintenance position.

4. The inkjet recording apparatus according to claim 1, wherein the second supply member supplies the cleaning liquid to the blade at the home position.

5. An inkjet recording apparatus comprising:

a blade which performs a wiping operation along a nozzle surface of an inkjet head;

a first supply member which is provided on a rear side of the nozzle surface in a moving direction in the wiping operation and supplies a cleaning liquid to the blade;

a second supply member which is provided on a front side of the nozzle surface in the moving direction in the wiping operation and supplies the cleaning liquid to the blade;

a wipe unit which includes the blade, the first supply member, the second supply member, and a waste liquid tray which receives a waste liquid containing the cleaning liquid; and a wipe sliding device which slides the wipe unit to a maintenance position below the inkjet head and a home position different from the maintenance position, wherein the waste liquid tray is provided with a receiving member which receives the waste liquid scattered from the blade on the front side of the nozzle surface in the moving direction in the wiping operation, the second supply member is provided on the receiving member, and the receiving member includes a removing member which removes the waste liquid including the cleaning liquid from the blade.

6. The inkjet recording apparatus according to claim 5, comprising:

a cleaning liquid supply source which is provided at the home position and supplies the cleaning liquid to the second supply member.

7. The inkjet recording apparatus according to claim 5, wherein the second supply member supplies the cleaning liquid to the blade at the maintenance position.

8. The inkjet recording apparatus according to claim 5, wherein the second supply member supplies the cleaning liquid to the blade at the home position.

* * * * *